United States Patent
Silvermintz et al.

(10) Patent No.: US 6,548,796 B1
(45) Date of Patent: Apr. 15, 2003

(54) CONFOCAL MACROSCOPE

(75) Inventors: Lawrence S. Silvermintz, Minneapolis, MN (US); Robert Elde, St. Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 09/338,808

(22) Filed: Jun. 23, 1999

(51) Int. Cl.⁷ .............................................. G02B 27/40
(52) U.S. Cl. ................................................... 250/201.3
(58) Field of Search ............................ 250/201.3, 202, 250/227.26, 229, 216, 208.1, 234–236; 362/321, 348; 359/368, 385, 386–389

(56) References Cited

U.S. PATENT DOCUMENTS

| | | | |
|---|---|---|---|
| 3,013,467 A | 12/1961 | Minsky | 88/14 |
| 3,590,260 A | 6/1971 | Holmes et al. | 250/231 |
| 3,712,955 A | 1/1973 | Miller | 178/6.6 R |
| 3,740,147 A | 6/1973 | Kallet | 356/96 |
| 3,743,427 A | 7/1973 | Weiser | 356/124 |
| 3,883,251 A | 5/1975 | Helava | 356/203 |
| 3,926,500 A | 12/1975 | Frosch et al. | 350/17 |
| 4,568,188 A | 2/1986 | Weber et al. | 356/384 |
| 4,631,581 A | 12/1986 | Carlsson | 358/93 |
| 4,634,880 A | 1/1987 | Lindow et al. | 250/566 |
| 4,700,298 A | 10/1987 | Palcic et al. | 364/414 |
| 4,733,063 A | 3/1988 | Kimura et al. | 250/201 |
| 4,806,004 A | 2/1989 | Wayland | 350/527 |
| 4,827,125 A | 5/1989 | Goldstein | 250/234 |
| 4,844,617 A | 7/1989 | Kelderman et al. | 356/372 |
| 4,863,226 A | 9/1989 | Houpt et al. | 350/6.5 |
| 4,863,252 A | 9/1989 | McCarthy et al. | 350/507 |
| 4,881,808 A | 11/1989 | Bille et al. | 351/221 |
| 4,884,881 A | 12/1989 | Lichtman et al. | 350/507 |
| 4,893,008 A | 1/1990 | Horikawa | 250/234 |
| 4,927,254 A | 5/1990 | Kino | 350/507 |
| 4,965,441 A | 10/1990 | Picard | 250/201.3 |
| 4,972,258 A | 11/1990 | Wolf et al. | 358/93 |
| 5,004,321 A | 4/1991 | Feldman et al. | 350/320 |
| 5,020,891 A | 6/1991 | Lichtman et al. | 350/527 |
| 5,022,743 A | 6/1991 | Kino et al. | 350/507 |

(List continued on next page.)

FOREIGN PATENT DOCUMENTS

| | | | | |
|---|---|---|---|---|
| DE | 4015988 | 11/1991 | | A61B/6/02 |
| GB | 2152697 | 8/1985 | | H04N/1/04 |
| GB | 2184321 | 6/1987 | | H04N/1/04 |
| GB | 2273994 | 7/1994 | | G02B/21/26 |

(List continued on next page.)

OTHER PUBLICATIONS

"Biomedical Products—Tools and Techniques for Life Science Researchers", 23(9):54 (1998) 2 pgs.

*Matrox Pulsar—Matrox Faxable: Fast Product Info*, 4 p., (Apr. 19, 1994).

"New Imaging Technology Provides Detection Sensitivity and Speed", *Microcontamination*, Product Technology News, pp. 58 & 60, (Sep./Oct. 1993).

(List continued on next page.)

*Primary Examiner*—Michael P. Stafila
(74) *Attorney, Agent, or Firm*—Schwegman, Lundberg, Woessner & Kluth, P.A.

(57) ABSTRACT

A confocal macroscope is disclosed. According to one embodiment of the present invention an imaging system includes a specimen stage, a source of a collimated excitation beam centered on a beam axis, and a scan-head movably positioned to focus the collimated excitation beam on a focal point in an object plane above the specimen stage and to receive light emitted or reflected from the object plane. According to another embodiment of the present invention the imaging system has three orthogonal motion axes that harness the quality of a collimated infinity space to stretch in scanning a specimen.

61 Claims, 13 Drawing Sheets

U.S. PATENT DOCUMENTS

| | | | | |
|---|---|---|---|---|
| 5,032,720 | A | 7/1991 | White | 250/236 |
| 5,047,643 | A | 9/1991 | Ogura | 250/327.2 |
| 5,054,926 | A | 10/1991 | Dabbs et al. | 356/345 |
| 5,065,008 | A | 11/1991 | Hakamata et al. | 250/216 |
| 5,067,805 | A | 11/1991 | Corle et al. | 359/235 |
| 5,078,482 | A | 1/1992 | Feldman et al. | 359/371 |
| 5,081,350 | A | 1/1992 | Iwasaki et al. | 250/234 |
| 5,084,612 | A | 1/1992 | Iwaski et al. | 250/216 |
| 5,091,652 | A | 2/1992 | Mathies et al. | 250/458.1 |
| 5,105,545 | A | 4/1992 | Fletcher | 33/201 |
| H1060 | H | 5/1992 | Lazich | 382/6 |
| 5,112,129 | A * | 5/1992 | Davidson et al. | 356/359 |
| 5,120,953 | A | 6/1992 | Harris | 250/227.2 |
| 5,127,730 | A | 7/1992 | Brelje et al. | 356/318 |
| 5,132,526 | A * | 7/1992 | Iwasaki | 250/201.3 |
| 5,144,477 | A | 9/1992 | White | 359/368 |
| 5,161,053 | A | 11/1992 | Dabbs | 359/384 |
| 5,162,641 | A | 11/1992 | Fountain | 250/201.2 |
| 5,162,648 | A | 11/1992 | Iwasaki | 250/216 |
| 5,162,941 | A | 11/1992 | Favro et al. | 359/386 |
| 5,179,276 | A | 1/1993 | Hakamata | 250/234 |
| 5,184,021 | A | 2/1993 | Smith | 250/560 |
| 5,196,713 | A | 3/1993 | Marshall | 250/561 |
| 5,210,636 | A | 5/1993 | Baer | 359/200 |
| 5,218,195 | A * | 6/1993 | Hakamata | 250/216 |
| 5,225,923 | A | 7/1993 | Montagu | 359/199 |
| 5,239,178 | A | 8/1993 | Derndinger et al. | 250/234 |
| 5,241,364 | A | 8/1993 | Kimura | 356/351 |
| 5,260,569 | A | 11/1993 | Kimura | 250/234 |
| 5,260,578 | A | 11/1993 | Bliton et al. | 250/461.1 |
| 5,283,684 | A | 2/1994 | Thomas et al. | 359/234 |
| 5,286,964 | A | 2/1994 | Fountain | 250/201.2 |
| 5,289,407 | A | 2/1994 | Strickler et al. | 365/106 |
| 5,296,700 | A | 3/1994 | Kumagai | 250/216 |
| 5,304,810 | A | 4/1994 | Amos | 250/458.1 |
| 5,323,009 | A | 6/1994 | Harris | 250/458.1 |
| 5,329,352 | A | 7/1994 | Jacobsen | 356/301 |
| 5,334,830 | A | 8/1994 | Fukuyama et al. | 250/216 |
| 5,377,001 | A | 12/1994 | Malin et al. | 356/237 |
| 5,377,002 | A | 12/1994 | Malin et al. | 356/237 |
| 5,381,224 | A | 1/1995 | Dixon et al. | 356/72 |
| 5,389,779 | A | 2/1995 | Betzig et al. | 250/216 |
| 5,416,327 | A | 5/1995 | Weiss et al. | 250/307 |
| 5,428,475 | A | 6/1995 | Tanaami et al. | 359/368 |
| 5,452,125 | A | 9/1995 | White et al. | 359/368 |
| 5,452,382 | A * | 9/1995 | Shionoya et al. | 385/11 |
| 5,479,024 | A | 12/1995 | Hillner et al. | 250/458.1 |
| 5,479,252 | A | 12/1995 | Worster et al. | 356/237 |
| 5,483,055 | A | 1/1996 | Thompson et al. | 250/201.3 |
| 5,581,082 | A | 12/1996 | Hansma et al. | 250/306 |
| 5,737,121 | A | 4/1998 | Dixon | 359/388 |
| 5,756,997 | A | 5/1998 | Kley | 250/306 |
| 5,760,951 | A | 6/1998 | Dixon et al. | 359/385 |
| 5,780,857 | A | 7/1998 | Harju et al. | 250/458.1 |
| 5,796,112 | A * | 8/1998 | Ichie | 250/458.1 |
| 5,814,820 | A * | 9/1998 | Dong et al. | 250/458.1 |
| 5,854,487 | A | 12/1998 | Braunstein et al. | 250/306 |
| 5,880,465 | A | 3/1999 | Boettner et al. | 250/234 |
| 6,248,988 | B1 * | 6/2001 | Krantz | 250/201.3 |

FOREIGN PATENT DOCUMENTS

| | | | |
|---|---|---|---|
| JP | 2221909 | 9/1990 | G02B/21/00 |
| JP | 6251427 | 9/1994 | G11B/7/26 |
| JP | 6281449 | 10/1994 | G01B/21/30 |
| NL | 8600459 | 9/1987 | G02B/21/00 |
| NL | 9000622 | 10/1991 | G01B/21/00 |
| WO | 92/02838 | 2/1992 | G02B/21/00 |
| WO | 94/18592 | 8/1994 | G02B/21/00 |
| WO | 94/27167 | 11/1994 | G01T/1/29 |

OTHER PUBLICATIONS

"Applications of Depth Discrimination", *Theory and Practice of Scanning Optical Microscopy*, Chapter 5, by: Tony Wilson, Academic Press Inc. (London) pp. 123–139, (1984).

"Biological Microscopes", *Nikon Corporation*, 21 p., (1991).

"Here's what's new with the Nikon Diaphot 300 and Diaphot 200", *Nikon Diaphot 300/200*, Nikon Corporation Inc., Instrument Group, 1300 Walt Whitman Read, Melville, NY 11747, pp. 1–23, (1993).

"Real Time Confocal Microscope, RCM 8000—Confocal Ratio Imaging 30 Frames/sec", *Nikon Corporation, Inc.*, 3 p., (1993).

"To Be A Giant Among Scanners, You Don't Have To Be Big. Or Expensive.", *Nikon Electronic Imaging*, p. 4 p., (1993).

"Ultima Premium Laser Confocal Microscope System, The Comprehensive Solution for Your Confocal Imaging and Quantitation Needs", *Meridian Instruments, Inc.*, 8 p., (1993).

Abbott, D.F., et al., "3–D widefield microscopy: towards an optimal filter for optical section data", *Bioimaging*, 1, pp. 207–213, (1993).

Agard, D.A., et al., "Three–dimensional architecture of a polytene nucleus", *Nature*, 302, pp. 676–681, (Apr. 21, 1983).

Aslund, N., et al., "A Method to Extract Homogeneous Regions in 3–D Confocal Microscopy Enabling Compensation for Depth Dependent Light Attenuation", *Micron and Microscopica Acta*, 23 (4), pp. 463–479, (1992).

Auran, J.D., et al., "Wide field scanning slit in vivo confocal microscopy of flattening–induced corneal bands and ridges", *Scanning*, 16 (3), Abstract, (1994).

Bailey, B., et al., "Enhancement of axial resolution in fluorescence microscopy by standing–wave excitation", *Nature*, 366, pp. 44–48, (Nov. 4, 1993).

Benedetti, P.A., et al., "Confocal–line microscopy", *Journal of Microscopy*, 165 (Pt. 1), pp. 119–129, (Jan. 1992).

Brakenhoff, G.J., et al., "Confocal scanning light microscopy with high aperture immersion lenses", *Journal of Microscopy*, 117 (Pt. 2), pp. 219–232, (Nov. 1979).

Brakenhoff, G.J., et al., "Three–dimensional imaging in fluorescence by confocal scanning microscopy", *Journal of Microscopy*, 156 (Pt. 2), Abstract, (Feb. 1989).

Brelje, T.C., et al., "Multicolor Laser Scanning Confocal Immunofluorescence Microscopy: Practical Application and Limitations", *Methods in Cell Biology*, V38, Chapter 4, pp. 97–181, (1993).

Brismar, H., et al., "Spectra and Fluorescence Lifetimes of Lissamine Rhodamine, Tetramethylrhodamine Isothiocyanate, Texas Red, and Cyanine 3.18 Fluorophores: Influences of Some Environmental Factors Recorded with a Confocal Laser Scanning Microscope", *The Journal of Histochemistry and Cytochemistry*, 43 (7), pp. 699–707, (1995).

Carlsson, K., et al., "Improved Fluorophore separation with IMS confocal microscopy", *Neuro Report*, 6 (8), pp. 1169–1173, (May 30, 1995).

Carlsson, K., et al., "Simultaneous confocal recording of multiple fluorescent labels with improved channel separation", *Journal of Microscopy*, 176 (Pt. 3), pp. 287–299, (Dec. 1994).

Carlsson, K., et al., "Three–dimensional imaging of neurons by confocal fluorescence microscopy", *Journal of Microscopy, 155* (Pt. 1), Abstract, pp. 15–26, (Jul. 1989).

Carlsson, K., et al., "Three–dimensional microscopy using a confocal laser–scanning microscope", *Optics Letters, 10* (2), pp. 53–55, (Feb. 1985).

Cohen, R., et al., "Automated tracing and volume measurements of neurons from 3–D confocal fluroescence microscopy data", *Journal of Microscopy, 173* (Pt. 2), pp. 103–114, (Feb. 1994).

Corle, T.R., et al., "Distance measurements by differential confocal optical ranging", *Applied Optics, 26* (12), pp. 2416–2420, (Jun. 15, 1987).

Cox, G., et al., "Confocal Microscopy of Actin, Tubulin, and Chloroplasts—Triple Labeling with a Two–Line Laser", *Journal of Computer–Assisted Microscopy, 5* (1), pp. 17–21, (1993).

Cremer, C., et al., "Considerations on a laser–scanning–microscope with high resolution and depth of field", *Microscopica Acta, 81* (1), pp. 31–44, (Sep. 1978).

De Haan, M.R., et al., "Intermodulation and Moiré Effects in Optical Video Recording", *Philips Res. Repts., 32* (5/6), pp. 436–459, (1977).

Delaney, P.M., et al., "Fiber–optic laser scanning confocal microscope suitable for fluorescence imaging", *Applied Optics, 33* (4), pp. 573–577, (Feb. 1, 1994).

Delaney, P.M., et al., "Fiberoptics in Confocal Microscopy", *Handbook of Biological Confocal Microscopy, Chapter 33*, Edited by James B. Pawey, Plenum Press, New York, pp. 515–523, (1995).

Dixon, T., "Random mask brightens image", *Nature, 383* (6603), pp. 760–761, (Oct. 31, 1996).

Dow, J., et al., "Improved image quality for epifluorescence microscopes through adapting confocal techniques", *American Biotechnology Laboratory, 11*(4), p. 80, (Mar. 1993).

Ellis, G.W., "A Fiber–Optic Phase–Randomizer For Microscope Illumination By Laser", *The Journal of Cell Biology, 83*, Abstract No. ME1610, p. 303 a, (Nov. 1979).

Gadella, Jr., T.W., et al.,"Fluorescence lifetime imaging miroscopy: pixel–by–pixel analysis of phase–modulation data", *Bioimaging, 2*, pp. 139–159, (1994).

Galbraith, W., et al., "Ramapping disparate images for coincidence", *Journal of Microscopy, 172* (Pt. 2), pp. 163–176, (1993).

Gan, X.S., et al., "Imaging in a confocal microscope with one circular and one annular lens", *Optics Communications 103*, pp. 254–264, (1993).

Goldman, L., "New dermatological biomedical microscopes for early clinical diagnostics", *Progress in Biomedical Optics—Proceedings of Clinical Applications of Modern Imaging Technology, V1894*, pp. 4–7, (Jan. 1993).

Grinvald, A., et al., "Simultaneous Optical Monitoring of Activity of Many Neurons in Invertebrate Ganglia Using a 124–Element Photodiode Array", *Journal of Neurophysiology, 45* (5), pp. 829–840, (May 1981).

Gu, M., et al., "Improved axial resolution in confocal fluorescence microscopy using annular pupils", *Optics Communications 110*, pp. 533–539, (Sep. 1, 1994).

Gu, M., et al., "Three–dimensional confocal fluorescence imaging under ultrashort pulse illumination", *Optics Communication 117*, pp. 406–412, (Jun. 15, 1995).

Hard, R., et al., "Phase–Randomized Laser Illumination for Microscopy", *J. Cell Sci., 23*, pp. 335–343, (1977).

Hausler, G., et al., "Simple focusing criterion", *Applied Optics—Letter to the Editor, 23* (15), pp. 2468–2471, (Aug. 1, 1984).

Hein, H.J., et al., "A comparative study of the application of scanning acoustic microscopy and confocal laser scanning microscopy to the structural assessment of human bones", *Annals of Anatomy,177*, pp. 427–430, (1995).

Hell, S., et al., "Fundamental improvement of resolution with a 4Pi–confocal fluorescence microscope using two––photon excitation", *Optics Communications 93* (5,6), pp. 277–282, (Oct. 15, 1992).

Hell, S.W., et al., "Confocal microscopy with an increased detection aperture: type–B 4Pi confocal microscopy", *Optics Letters, 19* (3), pp. 222–224, (Feb. 1, 1994).

Hiraoka, Y., et al., "Determination of three–dimensional imaging properties of a light microscope system", *Biophysical Journal, 57*, pp. 325–333, (Feb. 1990).

Inoue, S., "Foundations of Confocal Scanned Imaging in Light Microscopy", *Handbook of Biological Confocal Microscopy, Chapter 1*, Edited by James B. Pawley, Plenum Press, New York, pp. 1–17, (1995).

Jacobs, R.E., et al., "Magnetic Resonance Microscopy of Embryonic Cell Lineages and Movements", *Science, 263*, pp. 681–684, (Feb. 4, 1994).

Jansson, M., et al., "Laser–Induced Fluorescence Detection in Capillary Electrophoresis with Blue Light from a Frequency–Doubled Diode Laser", *Analytical Chemistry, 65* (20), pp. 2766–2769, (Oct. 15, 1993).

Juskaitis, R., et al., "Efficient real–time confocal microscopy with white light sources", *Nature, 383*, pp. 804–806, (Oct. 31, 1996).

Kesterson, J., et al., "Digital Implementation of a Laser Scanning Confocal Microscope Using Image Enhancement Algorithms", *IEEE Paper*, pp. III–89—III–92, (1992).

Kimura, S., et al., "Effect of axial pinhole displacement in confocal microscopes", *Applied Optics, 32* (13), pp. 2257–2261, (May 1, 1993).

Kubitscheck, U., et al., "Lateral Diffusion Measurement at High Spatial Resolution by Scanning Microphotolysis in a Confocal Microscope", *Biophysical Journal, 67*, pp. 948–956, (Sep. 1994).

Laurent, M., et al., "Power and limits of laser scanning confocal microscopy", *Biol. Cell, 80*, pp. 229–240, (1994).

Lea, D.J., et al., "Control of Excitation in the Fluorescence Microscope", *Journal of Immunological Methods, 31*, pp. 191–192, (1979).

Lerner, J.M., et al., "Aberration corrected holographically recorded diffraction gratings", *SPIE 240*, pp. 72–81, (1980).

Lichtman, J.W., et al., "High–Resolution Imaging of Synaptic Structure With a Simple Confocal Microscope", *The New Biologists, 1* (1), pp. 75–82, (Oct. 1989).

Marshall, K.C., "Adhesion and growth of bacteria at surfaces in oligotrophic habitats", *Can. J. Microbiol., 34*, pp. 503–506, (1988).

Meinel, A.B., et al., "Hyperbolic primary telescope configuration", Applied *Optics, 23*(15), pp. 2469–2471, (Aug. 1, 1984).

Mesce, K.A., et al., "Improvements for the anatomical characterization of insect neurons in whole mount: the use of cyanine–derived fluorphores and laser scanning confocal microscopy", *Cell & Tissue Research, 271*, pp. 381–397, (1993).

Nagelhus, T.A., et al., "Fading Correction for Fluorescence Quantitation in Confocal Microscopy", *Cytometry*, 23, pp. 187–195, (1996).

Netten, H., et al., "A fast scanner for fluorescence microscopy using a 2–D CCD and time delayed integration", *Bioimaging*, 2, pp. 184–192, (1994).

Oostveldt, P.V., et al., "Heterogeneous Photobleaching in Confocal Microscopy Caused by Differences in Refractive Index and Excitation Mode", *Cytometry*, 32, pp. 137–146, (1998).

Paddock, S., et al., "On laser scanning confocal microscopy and three dimensional volume rendering of biological structures", *SPIE 1205*, pp. 20–28, (1990).

Paddock, S.W., et al., "Methods and Applications of Three–Color Confocal Imaging", *Short Techniccal Reports*, 22 (*1*), pp. 120–126, (Jan. 1997).

Pennington, R.L., et al., "The Automated Plate Scanner Catalog of the Palomar Sky Survey. I. Scanning Parameters and Procedures", *Publications of the Astronomical Society of the Pacific*, 105, pp. 521–526, (May 1993).

Qian, Z.L., et al., "Circulating Antigents in Schistosoma–Infections", *Acta Leidensia*, 49, pp. 71–80, (1982).

Quesada, M.A., et al., "High–Sensitivity DNA Detection with a Laser–Excited Confocal Fluorescence Gel Scanner", *BioTechniques*, 10 (*5*), pp. 616–625, (May 1991).

Rigaut, J.P., et al., "High–Resolution Three–Dimensional Images from Confocal Scanning Laser Microscopy", *Analytical and Quantitative Cytology and Histology*, 13 (*4*), pp. 223–232, (Aug. 1991).

Rigaut, J.P., et al., "Three–Dimensional DNA Image Cytometry by Confocal Scanning Laser Microscopy in Thick Thissue Blocks", *Cytometry*, 12, pp. 511–524, (1991).

Sabri, S., et al., "Interest of Image Processing in Cell Biology and Immunology", *Journal of Immunological Methods*, 208, pp. 1–27, (1997).

Saloma, C., et al., "Site–Specific confocal fluorescence imaging of biological microstructures in a turbid medium", *Phys. Med. Biol.*, 43, pp. 1741–1759, (1998).

Sandison, D.R., et al., "Quantitative comparison of background rejection, signal–to–noise ratio, and resolution in confocal and full–field laser scanning microscopes", *Applied Optics*, 34 (*19*), pp. 3576–3587, (Jul. 1, 1995).

Schwartz, S., et al., "Real–time laser–scanning confocal ratio imaging", *American Laboratory—New Technique in Microscopy and Image Analysis*, 4 p., (Apr. 1993).

Sheard, S., et al., "Intergrated–Optic Implementation of a Confocal Scanning Optical Microscope", *Journal of Lightwave Technology*, 11 (*8*), pp. 1400–1403, (Aug. 1993).

Travis, J., "Watching New Developments—Live", *Science*, 263, p. 610, (Feb. 4, 1994).

Tsien, R.Y., "Laser Scanning Confocal Fluorescence Microscopy at Video Rate (30 frames/sec) with Dual–Wavelength Emission Rationing for Quantitative Imaging of Intracellular Messengers", *Abstract Presented at Micro*, London, England, (Jul. 1990).

van Resandt, R.W., et al., "Optical Fluorescence microscopy in three dimensions: microtomoscopy", *Journal of Microscopy*, 138 (*Pt. 1*), pp. 29–34, (Apr. 1985).

Walker, J.G., et al., "Superresolving scanning optical microscopy using holographic optical processing", *J. Opt. Soc. Am. A.*, 10 (*1*), pp. 59–64, (Jan. 1993).

Watson, T.F., "Fact and Artefact in Confocal Microscopy", *Adv. Dent. Res.*, 11 (*4*), pp. 433–441, (Nov. 1997).

Wessendorf, M.W., et al., "Multicolor Fluorescence Microscopy Using the Laser–Scanning Confocal Microscope", *Neuroprotocols: A Companion to Methods in Neuroscience*, 2, pp. 121–140, (1993).

White, J.G., et al., "An Evaluation of Confocal Versus Conventional Imaging of Biological Structures by Fluorescence Light Microscopy", *The Journal of Cell Biology*, 105, pp. 41–48, (Jul. 1987).

Wilson, T., "Image formation in two–mode fiber–based confocal microscopes", *Opt. Soc. Am. A.*, 10 (*7*), pp. 1535–1543, (Jul. 1993).

Wilson, T., "Scanning Optical Microscopy", *Scanning*, 7 (*2*), pp. 79–87, (1985).

Wilson, T., et al., "Fibre optic interference and confocal microscopy", *Optics Communications 110*, pp. 1–6, (Aug. 1, 1994).

Wu, Z., et al., "Analysis of Depth Response for Fluorescent Confocal Scanning Microscope", *Progress in Biomedical Optics —Proceedings of Holography, Interferometry, and Optical Pattern Recognition in Biomedicine III, V1889*, pp. 39–47, (Jan. 1993).

Pawley, J. B., *Handbook of Biological Confocal Microscopy, Second Edition, Chapters 1, 9, 10, 29, 30 & Appendix 2*, Plenum Press, New York, NY, pp. 1–17, 139–165, 459–490, 581–598 (1995).

Aslund, N., et al., "PHOIBOS, A Microscope Scanner Designed for Micro–fluorometric Applications, Using Laser Induced Fluorescence", *Proceedings of the Third Scandinavian Conference on Image Analysis*, Copenhagen, Denmark, pp. 338–343, (1983).

Ellis, G.W., "Microscope Illuminator with Fiber Optic Source Integrator", *Abstract, The Journal of Cell Biology*, 101 (*5*), (Nov. 1985).

Marsman, H.J., et al., "Mechanical Scan System for Microscopic Applications", *Review of Science Instruments*, 54 (*8*), pp. 1047–1052, (Aug. 1983).

Minsky, M., "Memoir on Inventing the Confocal Scanning Microscope", *Scanning*, 10 (*4*), pp. 128–138, (1988).

Brakenhoff, G.J., et al., "Three–Dimensional Chromatin Distribution in Neuroblastoma Nuclei shown by Confocal Scanning Laser Microscopy", *Nature*, 317, pp. 748–749, (Oct. 24, 1985).

Cannon, J., et al., "Ultraviolet lasers expand uses of confocal microscopes", *Laser Focus World*, 4 p., (Jan. 1993).

Dong, C.Y., et al., "Fluorescence Lifetime Imaging by Asynchronous Pump–Probe Microscopy", *Biophysical Journal*, 69, pp. 2234–2242, (Dec. 1995).

Freimann, R., et al., "Development of a Standing–Wave Fluorescence Microscope with High Nodal Plane Flatness", *Journal of Microscopy*, 187 (*pt. 3*), pp. 193–200, (Sep. 1997).

Gmitro, A.F., et al., "Confocal Microscopy Through a Fiber–Optic Imaging Bundle", *Optics Letters*, 18(*8*), pp. 565–567, (Apr. 15, 1993).

Oldenbourg, R., et al., "Image Sharpness and Contrast Transfer in Coherent Confocal Microscopy", *Journal of Microscopy*, 172 (*pt. 1*), pp. 31–39, (Oct. 1993).

Schmitt, J.M., et al., "Confocal Microscopy in Turbid Media", *J. Opt. Soc. Am. A.*, 11 (*8*), pp. 2226–2235, (Aug. 1994).

Sheppard, C.J., et al., "A Scanning Optical Microscope for the Inspection of Electronic Devices", *Microcircuit Engineering*, Edited by H. Ahmed et al., Cambridge University Press, Cambridge, pp. 447–454, (1980).

* cited by examiner

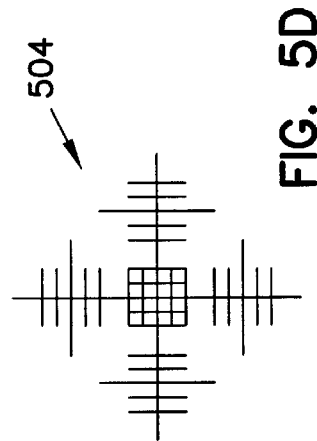
FIG. 5C
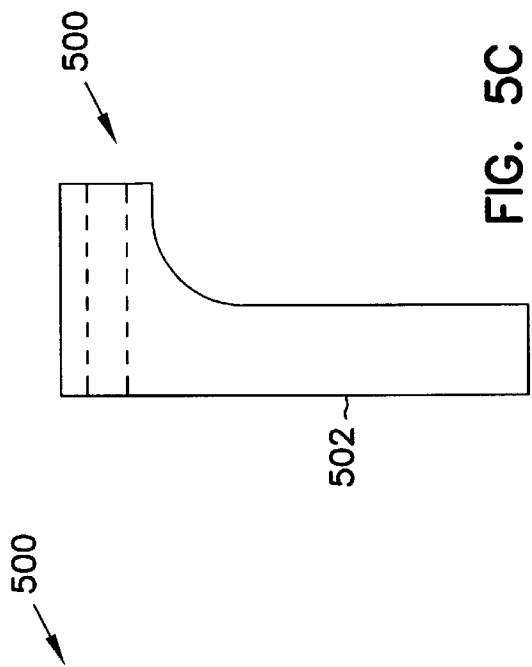
FIG. 5D
FIG. 5A
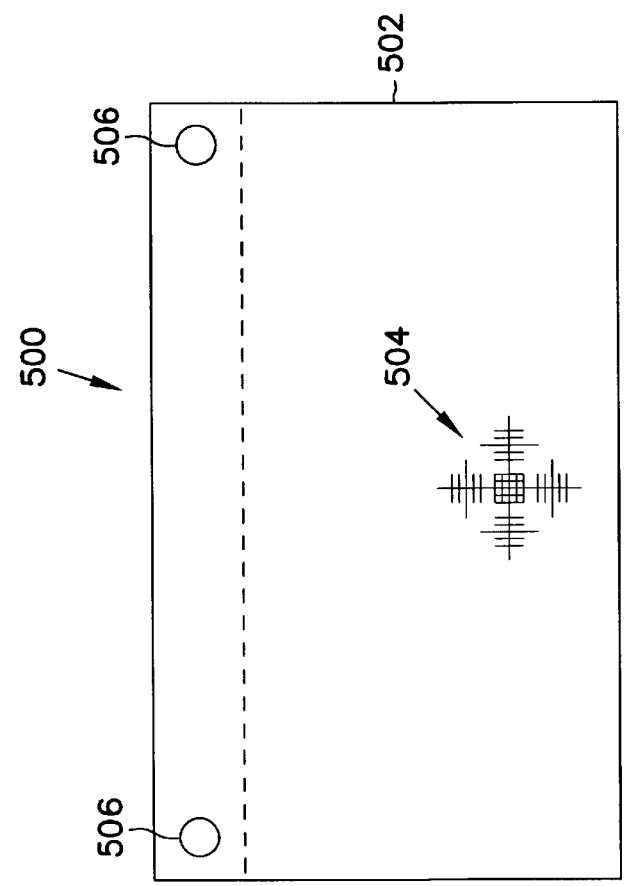
FIG. 5B

CONFOCAL MACROSCOPE

This invention was made with government support awarded by National Institutes of Health #1R01-DA09643-04 and 5R01-DA09643-04 and by National Science Foundation #EBN-9419233. The Government has certain rights in this invention.

FIELD OF THE INVENTION

The present invention relates generally to confocal imaging systems, and more particularly to a confocal macroscope.

BACKGROUND

Confocal microscopes with coherent optical illumination are capable of producing very thin optical sectioning yielding sharp 3-D image volume data sets and an image of a specimen with much better contrast between fine details than is possible with non-confocal imaging systems such as wide-field instruments known to those skilled in the art. Confocal microscopes are employed to produce images of many types of specimens such as biological materials and semiconductor devices.

A schematic diagram of the essential components of a conventional confocal microscope 100 is shown in FIG. 1. A light source 110, such as a laser in the instance of monochromatic illumination, generates light that is deflected off of a beamsplitter 114, which directs the light toward an objective lens 116. The objective lens 116 focuses the light at a focal point 118 in a specimen 120. The focal point 118 is a small illuminated area in a focal plane, also called an object plane 122, in the specimen 120. In the instance of fluorescent imaging, if the specimen 120 is stained with fluorescent dye that is illuminated with a wavelength near its excitation maximum, then it will emit fluorescent light of a Stokes-shifted wavelength. Fluorescent molecules at the focal point 118 emit Stokes-shifted light rays toward the objective lens 116 which focuses the emitted rays into a confocal pinhole in a conjugate image plane. The confocal pinhole is also called an image pinhole 130 and is located in a plate 132 placed in the conjugate image plane for the focal point 118. In the instance of fluorescent imaging the beamsplitter 114 transmits the fluorescent light to the image pinhole 130, and the fluorescent light passing through the image pinhole 130 is detected by a photodetector 140 such as a photomultiplier tube (PMT). The photodetector 140 generates a signal indicating an intensity of the fluorescent light passing through the image pinhole 130, and the signal is processed by an appropriate data processing system (not shown). An image of the specimen 120 in the object plane 122 is generated by moving the focal point 118 relative to the specimen 120 such that the focal point 118 traverses the object plane 122 in the specimen 120 in a pattern such as a raster pattern. The data processing system assembles the signal from the photodetector 140 to generate the image. Images of different sectional depths of the specimen 120 may be generated by moving the object plane 122 relative to the specimen 120.

If the specimen 120 is reflective then the illumination light is reflected back toward the objective lens 116 and the beamsplitter 114 to be focused on the image pinhole 130 and detected by the photodetector 140. An example of a reflective specimen 120 is an integrated circuit wafer specimen.

Beam-scanning or stage-scanning confocal microscopes differ from wide-field instruments in two major aspects: an illumination spot and an image pinhole. First, in the confocal microscopes rays of light impinging on a specimen from an objective lens are converged along a cone to a single focal point or apex in an object plane in the specimen. This is in contrast to a wide-field instrument where, in each instant, the entire area circumscribed by the field-of-view of the objective lens is illuminated simultaneously. This area includes information from points extending through the entire depth of the specimen, including points above and below the object plane of the objective lens. One advantage of the beam-scanning or stage-scanning confocal microscopes is that all of the light is focused on the focal point in the object plane to produce a much more intense excitation of each scanned point of the specimen, with greater spatial specificity of the area being excited.

A second advantage of the beam-scanning or stage-scanning confocal microscopes is the pinhole in the emission/detection path. Some of the rays of light emanating from the object plane as a result of the illumination light will retrace the path of the impinging path through the objective lens to be collected at a point in the conjugate image plane. The confocal pinhole or image pinhole at the conjugate image plane acts as a spatial-filter to remove out-of-focus rays of light which emanated from points above, below, or to the side of the focal point or apex in the specimen. A single focal point in the specimen is examined at a time. If the focal point of the objective lens is scanned over the specimen at different object planes, then a three-dimensional data set of the specimen may be obtained. The greater intensity of confocal illumination and a segregation of adjacent object planes through which the focal point is scanned allow for the generation of low-distortion images of slices of a thick specimen such as a biological tissue section.

The intensity of illumination in a confocal microscope is enhanced if the excitation light source is a laser such as the laser 110 shown in FIG. 1. Arc-lamps normally used in wide-field instruments have much less optical power at a given excitation wavelength. Arc-lamps are also not as capable as a laser of providing a narrow excitation wavelength while excluding other wavelengths or colors, as arc-lamps emit wavelengths throughout a very broad spectrum. Lasers produce just a few colors or discrete wavelength lines with negligible energy in other spectral regions.

The confocal microscope has undergone many exciting and ingenious changes since its conception by M. Minsky, described in U.S. Pat. No. 3,013,467, with its defining characteristic being a detector pinhole. Minsky used arc-lamp illumination and a pair of orthogonally oriented, electromechanically oscillated tuning forks to translate a specimen. Advances in confocal designs are disclosed in Sheppard et al. "A Scanning Optical Microscope For The Inspection Of Electrical Devices" Microcircuit Eng., Cambridge, 1980, p.447–454 and in Marsman et al. "Mechanical Scan System for Microscopic Applications"; Rev. Sci. Instrument, 1047–1052, 54(8). These confocal microscopes use resonant galvanometers to oscillate the specimen, incorporate laser illumination and PMT detection, scan in real-time, and are used for observing the functional processes of living cells. They are limited to scanning areas of only about 1 mm on a side. The confocal microscopes described so far are categorized as "stage-scanners", because they move the specimen on a support stage with respect to a fixed optical beam.

Laser beam scanning confocal microscopes, also called beam scanners, are described in Åslund et al., "PHOIBOS, A Microscope Scanner Designed For Micro-Fluorometric Applications, Using Laser Induced Fluorescence, Proceedings of the Third Scandinavian Conference on Image Analysis, Copenhagen, Denmark (1983). Beam scanners angularly deflect an illumination and detection beam with respect to a central axis of an objective lens, using tilting mirrors or acousto-optic devices. Beam scanners have an advantage in that a specimen is not jostled during scanning, and the specimen position may be adjusted without disturbing the scanner. However, spherical and chromatic aberrations in the objective lens are accentuated as the beam is deflected towards the periphery of the field. The field of view is both delimited and restricted by the diameter of the exit pupil of the objective lens which is typically less than half a millimeter. This produces an image that is bowl-shaped which may extend out of the specimen, and is not a flat-field scan. The introduction of beam scanners was contemporaneously accompanied by the implementation of digital storage.

Beam scanners and early stage scanner designs have drawbacks due to an angular scan, nonlinear velocity, and a curved scan path. These result in images that are irregular in shape, flawed quantitatively, and limited in field-of-view. This is partly attributed to the fact that with a fixed time-clock, both the spatial size of samples and the strength of the detected optical signal relative to a concentration of fluorescent dye molecules in a specimen are inversely related to the instantaneous velocity of the beam within the specimen.

Most of the commercially available confocal microscopes sold today are beam scanners. They are more than sufficient for viewing circumscribed specimens which fit neatly within the objective lens' field of view. They are also more than sufficient for glimpsing isolated fields of a larger specimen. They also are well suited for monitoring live processes, where small scan spaces can translate into short frame times. Their edge distortion makes them problematic for producing images of extended areas. Attempts to seamlessly align image tiles produced by a beam-scanner to create a montage from scans of adjacent fields of view is cumbersome, due to the tiles' distorted edges and the need for a separate mechanism, independent of the scanner, to move a specimen stage between tiles.

Recently, large field-of-view stage scanners have been patented in U.S. Pat. No. 5,184,021 to Smith and U.S. Pat. No. 5,091,652 to Mathies et al. Each describe flat-bed x-y scanners. These models allow seamless scanning, but at a limited resolution and speed. Such large-specimen stage scanners also place great stresses on a specimen at high scan rates, which are necessary in fluorescent imaging to avoid bleaching fluorescent dye in the specimen, and to collect copious data in a timely manner. Not jostling the specimen is critical in applications in which biological tissue cannot be dry-mounted. Further, even dry-mounted biological specimens are susceptible to impact damage.

U.K. Patent Application Number 2,184,321 to White describes a spiral configuration stage scanner having a scan motion without wasted time or as much jostling due to rectilinear motion reversal. However, the data set it generates is spatially irregular, due to uneven dwell time and a curved scan path.

There remains a need for a confocal imaging system capable of efficiently, accurately, and without jarring a specimen, generating a clear image of the specimen having a large cross-sectional area.

SUMMARY OF THE INVENTION

According to one embodiment of the present invention an imaging system comprises a specimen stage, a source of a collimated light beam centered on a beam axis, and a scan-head movably positioned to focus the collimated light beam on a focal point in an object plane above the specimen stage and to receive light emitted or reflected from the object plane. The collimated light beam is comprised of parallel light rays, and infinity space is the region in which the light beam is collimated. The scan-head is translated coaxial to the beam axis and takes advantage of the capacity of infinity space to stretch. According to another embodiment of the present invention a method comprises generating a collimated light beam centered on a beam axis and defining a region of infinity space, focusing the collimated light beam on a focal point in an object plane in a specimen on a specimen stage with an objective lens, and detecting light reflected or emitted from the specimen at the focal point to generate image data.

BRIEF DESCRIPTION OF THE DRAWINGS

FIGS. 5A, B, C, and D are drawings of a scan-head beam target according to an embodiment of the present invention.

DETAILED DESCRIPTION

Figure 1:
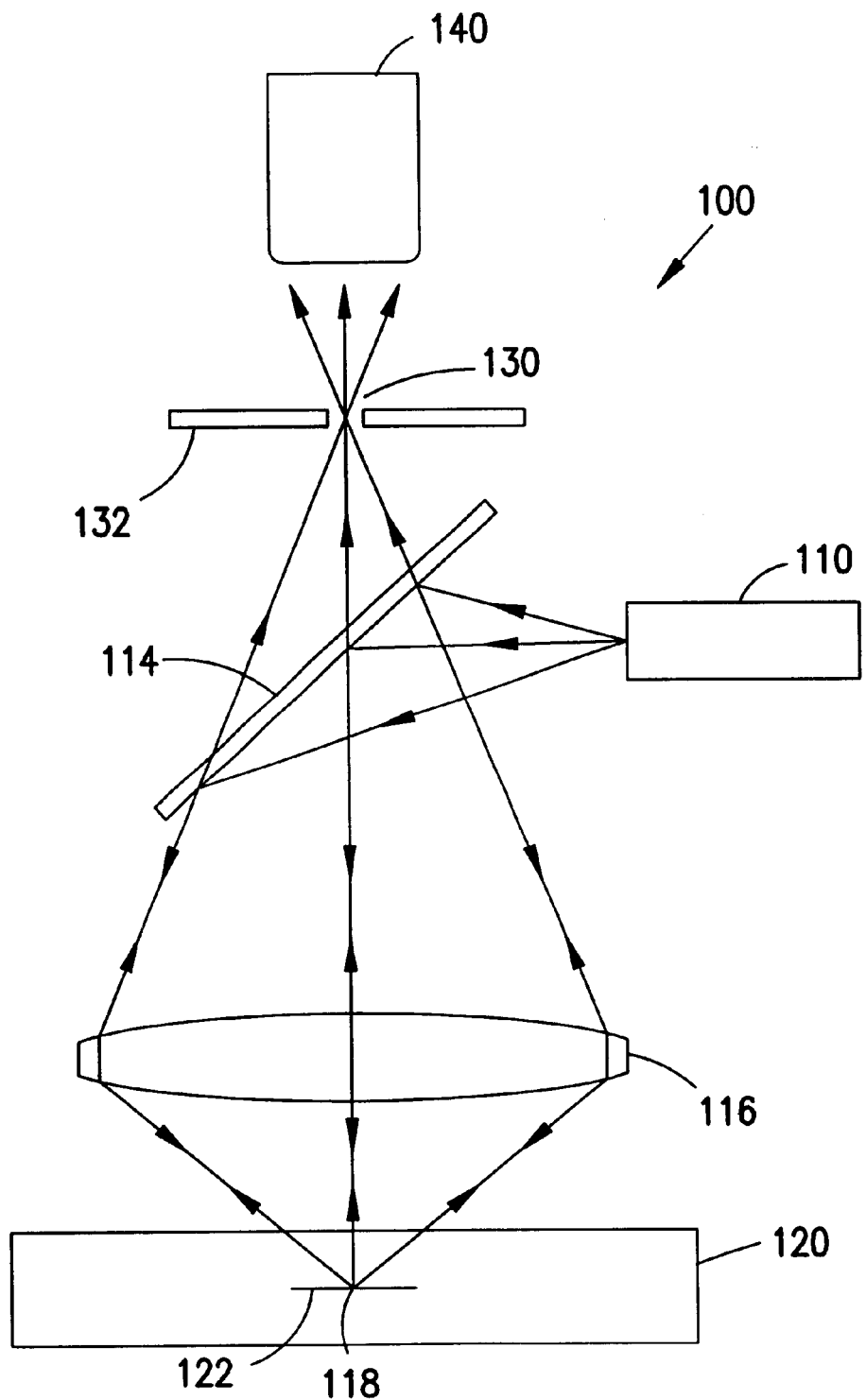
FIG. 1 is a schematic diagram of a confocal microscope according to the prior art.

In the following detailed description of exemplary embodiments of the present invention, reference is made to the accompanying drawings which form a part hereof, and in which are shown by way of illustration specific exemplary embodiments in which the present invention may be practiced. These embodiments are described in sufficient detail to enable those skilled in the art to practice the present invention, and it is to be understood that other embodiments may be utilized and that logical, mechanical, optical, electrical and other changes may be made without departing from the spirit or scope of the present invention. The following detailed description is, therefore, not to be taken in a limiting sense, and the scope of the present invention is defined only by the claims.

The exemplary embodiments are shown in the drawings with different views of similar elements. Where an element is shown in several Figures it will be identified with the same reference character for purposes of clarity.

A confocal macroscope according to an embodiment of the present invention is a highly automated "hybrid stage scanning" confocal epi-illumination microscopic imaging system capable of rapidly collecting seamless data sets at sub-micrometer resolution over extended areas of a specimen. The term macroscope identifies the capability of the imaging system to produce seamless 3-dimensional images over the extended areas. The confocal macroscope employs a beam of collimated light which is comprised of parallel light rays, and infinity space is the region in which the light beam is collimated, i.e., the focal point is at infinity. If such a collimated light beam is reflected from a flat mirror or transmitted through a flat optical element, it remains collimated for virtually an infinite distance. It can be bent by reflection by a relatively unlimited number of flat mirrors placed at any arbitrary distance without affecting the collimation of the light beam. In contrast, a diverging light beam or a converging light beam (i.e., a non-collimated light beam) has a finite focal distance. If such a non-collimated light beam is reflected from a flat mirror, its total focal distance remains finite and unchanged, although the path of the light beam is bent by the reflection. Therefore the number and spacing of the mirrors is limited by the focal length of the non-collimated light beam. In addition, if a non-collimated light beam is transmitted through a flat optical element, a refraction effect will change the focal distance of the light beam. The amount of change varies with the refractive index and thickness of the flat transmissive optical element.

Figure 2A:
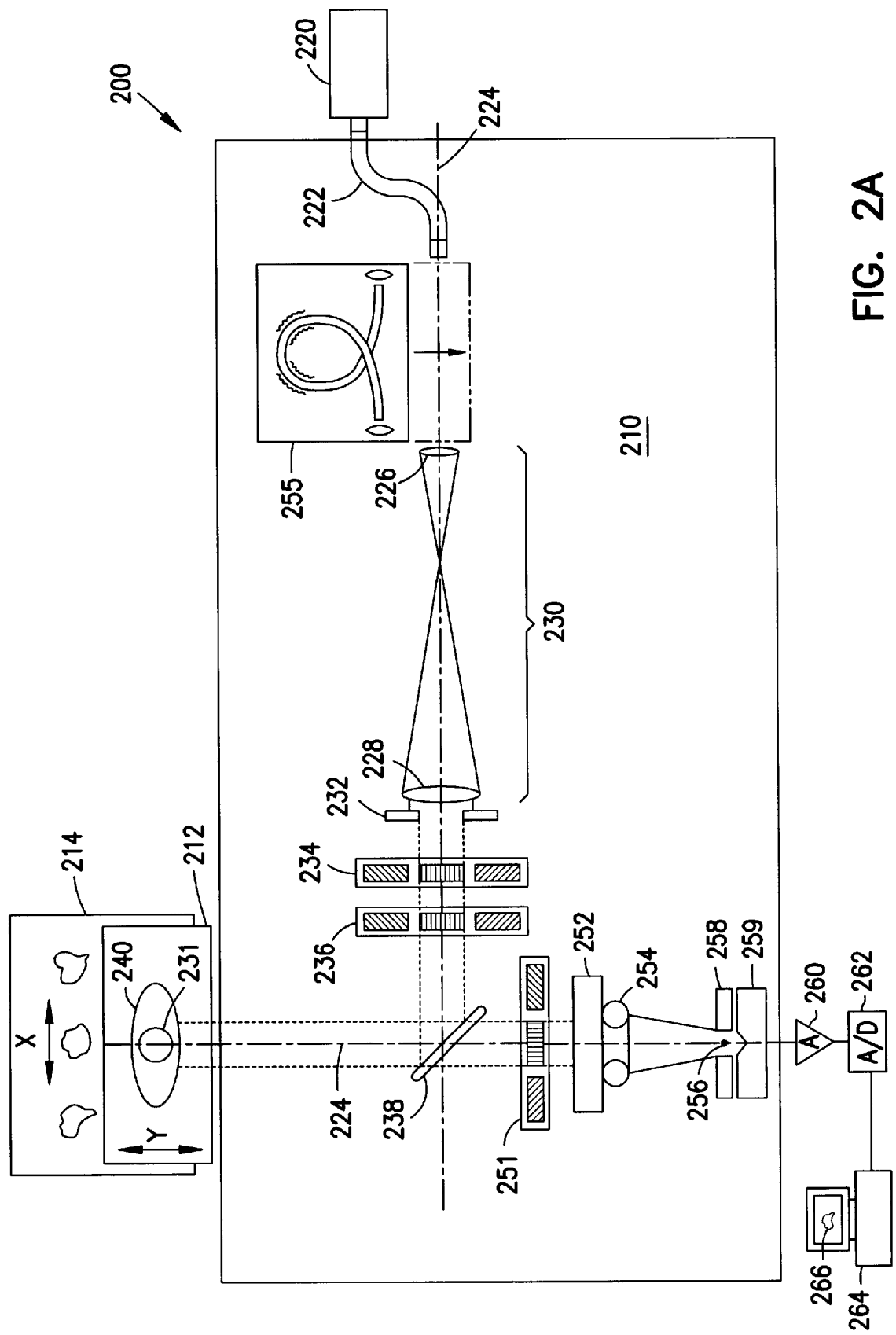
FIGS. 2A, B, C, D, and E are schematic diagrams of a confocal macroscope according to an embodiment of the present invention.

A schematic diagram of a confocal macroscope 200 according to an embodiment of the present invention is shown in FIGS. 2A, B, C, D, and E. The confocal macroscope 200 shown in FIG. 2A includes an optics board 210 supporting fixed, precision-aligned optics that generate a collimated excitation beam of light directed toward a scan-head 212 which focuses the collimated excitation beam toward a specimen stage 214. The collimated excitation beam is generated by the following elements. A laser 220 generates a coherent excitation beam that is guided to the optics board 210 by a single-mode optical fiber 222 which preserves the coherence, or the polarization and alignment of the excitation beam, and acts as a spatial filter or a virtual pinhole. The coherent excitation beam from the laser 220 has light waves that are in phase with each other. The excitation beam from the laser 220 is centered on an excitation beam axis 224, and is expanded and collimated using a pair of positive converging lenses 226, 228 in a beam expander 230. The beam expander 230 expands the $1/e^2$ diameter of the excitation beam to be more than three times that of a back aperture of a chromatically corrected objective lens 231 in the scan-head 212 which is described below. The excitation beam emerges from the beam expander 230 as a collimated excitation beam establishing an infinity space. The collimated excitation beam has a Gaussian intensity profile centered on the excitation beam axis 224 that is truncated by an iris diaphragm 232 that blocks peripheral rays of the collimated excitation beam. The collimated excitation beam passes through a neutral density filter 234 to attenuate the intensity of the collimated excitation beam and an excitation filter 236 which is a bandpass filter removing unwanted wavelengths in the collimated excitation beam. The collimated excitation beam is then reflected by a polychroic beamsplitter 238 off the optics board 210 and towards the scan-head 212.

Figure 2B:
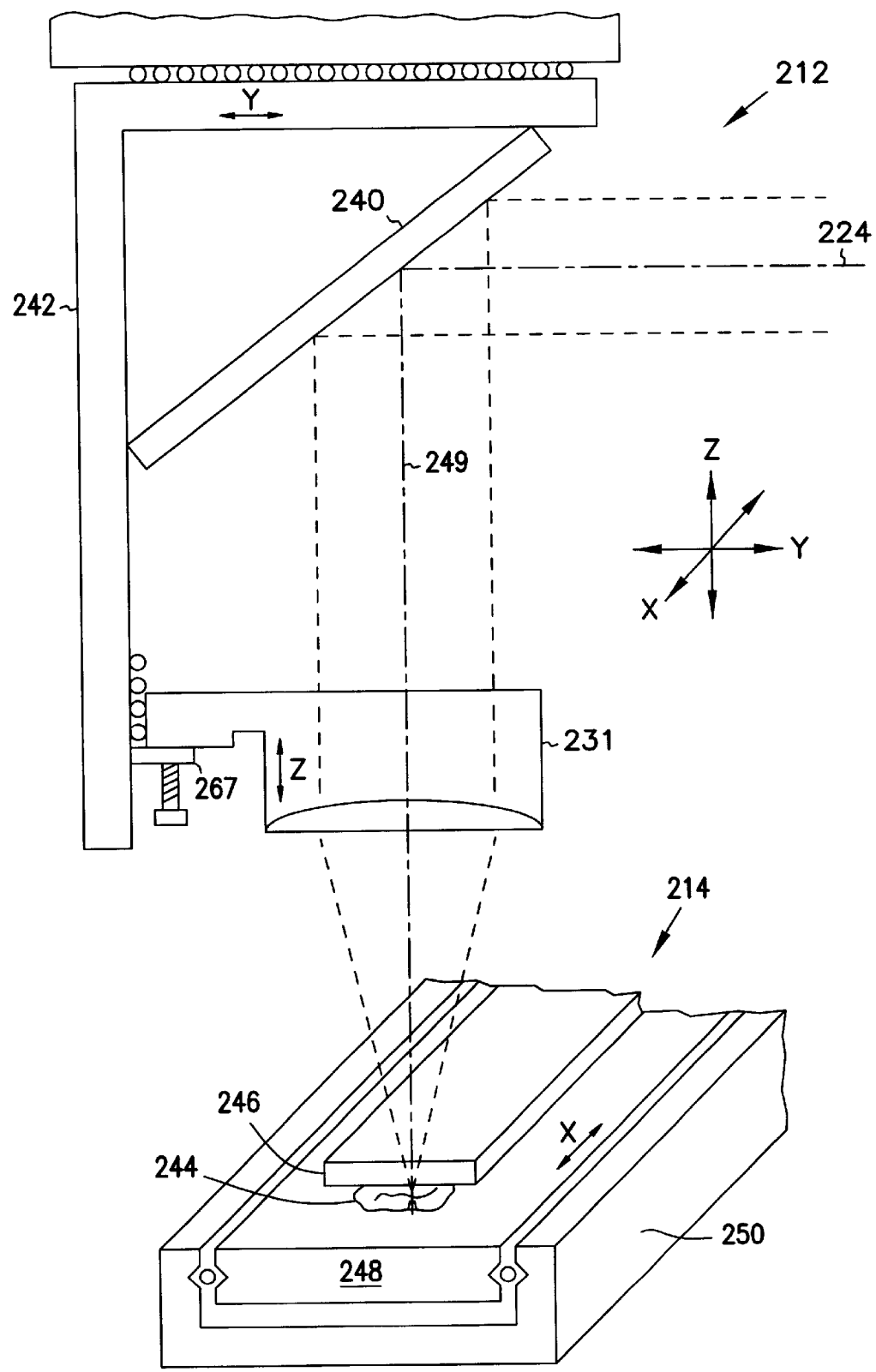

The scan-head 212, shown in greater detail in FIG. 2B, includes a flat mirror 240 mounted on a bracket 242. The flat mirror 240 reflects the collimated excitation beam normally and coaxially onto the objective lens 231 which focuses the collimated excitation beam to a focal point in an object plane in a specimen 244. The objective lens 231 is infinity-corrected for chromatic aberrations. The specimen 244 is placed under a cover glass 246 and rests on a base 248 on the specimen stage 214. The specimen 244 is typically supported by a substrate such as a glass slide (not shown) which sits on the base 248. For repeatable repositioning, the substrate may be seated against a shallow locator corner (not shown) which is affixed to the base 248. The base 248 is movably mounted to a support 250 by bearings and may move along an x-axis. A central axis 249 passes through a geometric center of the objective lens 231 and through the focal point. The flat mirror 240 preserves the parallel rays in the collimated excitation beam as it is reflected toward the objective lens 231. The collimated excitation beam is reflected so that the excitation beam axis 224 is maintained coaxial with the central axis 249 of the objective lens 231.

In response to the light at the focal point of the objective lens 231, the specimen 244 either reflects the light or emits fluorescent light from the focal point toward the objective lens 231. This light follows a path that is collinear with a line traced by the collimated excitation beam traveling to the specimen 244 through the objective lens 231. The beamsplitter 238 transmits the light from the specimen 244 through an emission filter 251, which is a bandpass filter, to a tube lens (not shown) in a trinocular microscope head 252. In the instance of fluorescent specimen scanning, the beamsplitter 238 transmits light having Stokes-shifted wavelengths of fluorophores in the specimen 244 excited by one of the wavelengths generated by the laser 220. The trinocular microscope head 252 includes a pair of oculars 254, which are used in conjunction with a beam scrambler 255, described below, for viewing the light directly. The tube lens focuses the light toward an image pinhole 256 in a plate 258 forming a conjugate image plane with the object plane in the specimen 244. The image pinhole 256 allows photons from a focal point in the specimen 244 to pass through while the plate 258 blocks other light. Photons passing through the image pinhole 256 are detected by a photodetector 259 that transduces the light level into a proportional electronic signal. The signal is low-pass filtered, integrated, scaled and shifted using analog amplification circuitry 260, and is then digitized by a sample A/D conversion circuit 262. This digital information is passed to a control and data processing system 264 for storage, processing and display of an image 266.

The scan-head 212 is movable along a y-axis parallel with the excitation beam axis 224 of the collimated excitation beam as it emerges from the optics board 210. The objective lens 231 is motorized to be movable on a z-axis with respect to the scan-head 212. The z-axis is normal to the object plane in the specimen 244 and parallel with the central axis 249 of the objective lens 231. The base 248 is movable along an x-axis that is orthogonal to both the y and z-axes. Motorized movement of the scan-head 212 and the base 248 may be controlled by a control system (not shown) so that the focal point of the objective lens 231 traverses the object plane through the specimen 244 parallel to and defined by the x and y-axes and the image 266 of the specimen 244 in the object plane may be generated. The objective lens 231 may be moved along the z-axis, with respect to the scan-head 212, via a focus motor 267 controlled by the control system, closer to or further from the specimen 244 so as to change the position of the object plane and obtain an image in a different cross-section of the specimen 244.

As described above, the collimated excitation beam is reflected by the flat mirror 240 so that the excitation beam axis 224 is maintained coaxial with the central axis 249 of the objective lens 231. When the scan-head 212 is moved along the y-axis relative to the optics board 210 the infinity space in which the collimated excitation beam exists expands and contracts as the excitation beam remains collimated. The flat mirror 240 preserves the parallel rays in the collimated excitation beam as it is reflected toward the objective lens 231. The flat mirror 240 moves parallel with the excitation beam axis 224 along the y-axis and the reflected collimated excitation beam remains stationary relative to the central axis 249 of the objective lens 231. Since the excitation beam is not deflected from the central axis 249, no aberrations related to being off-axis are present. There are three completely orthogonal axes in the confocal macroscope according to the embodiment of the present invention: the x-axis collinear with the movement of the base 248, the y-axis collinear with the movement of the scan-head 212, and the z-axis collinear with the movement of the objective lens 231. The quality of the light focused on the specimen 244 remains high as the scan-head 212 and the base 248 are moved to generate the image 266 of a large specimen 244.

Figure 2C:
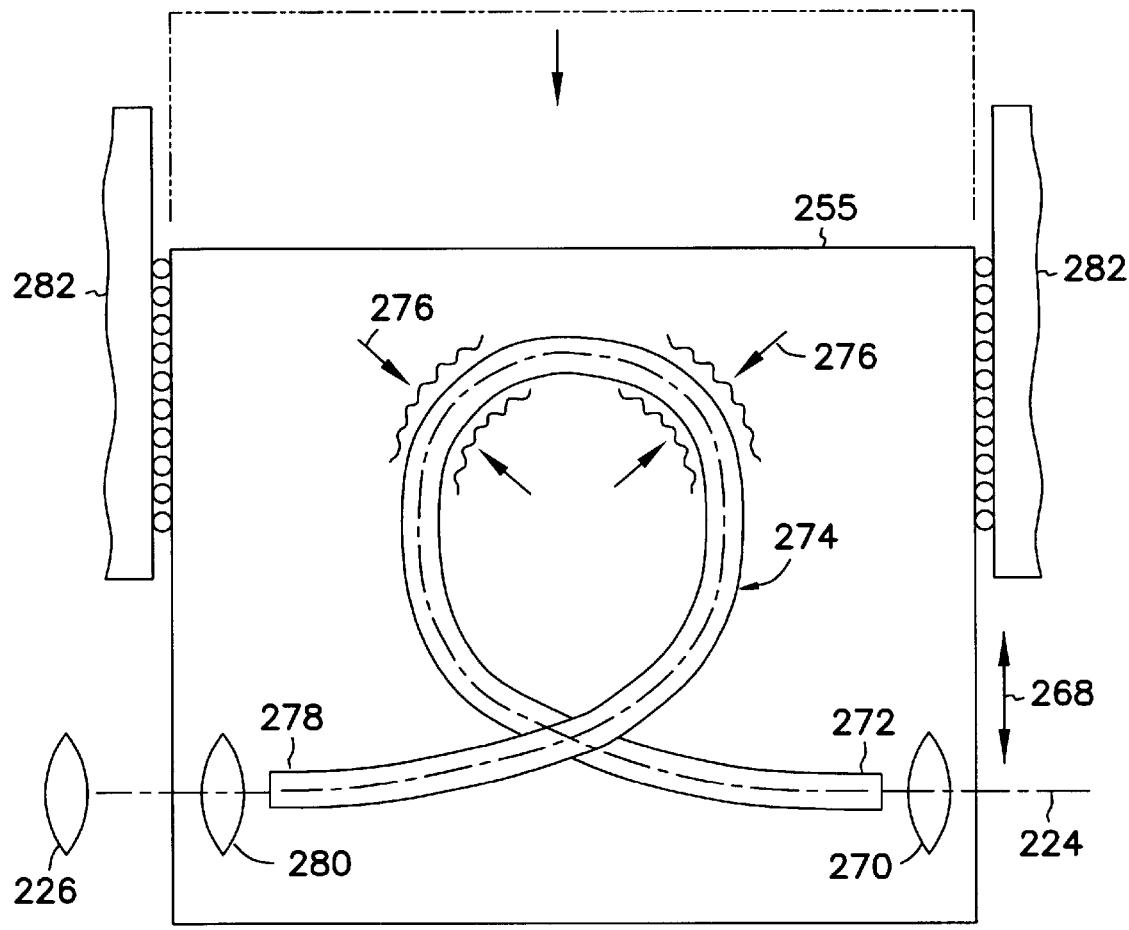
Figure 2D:
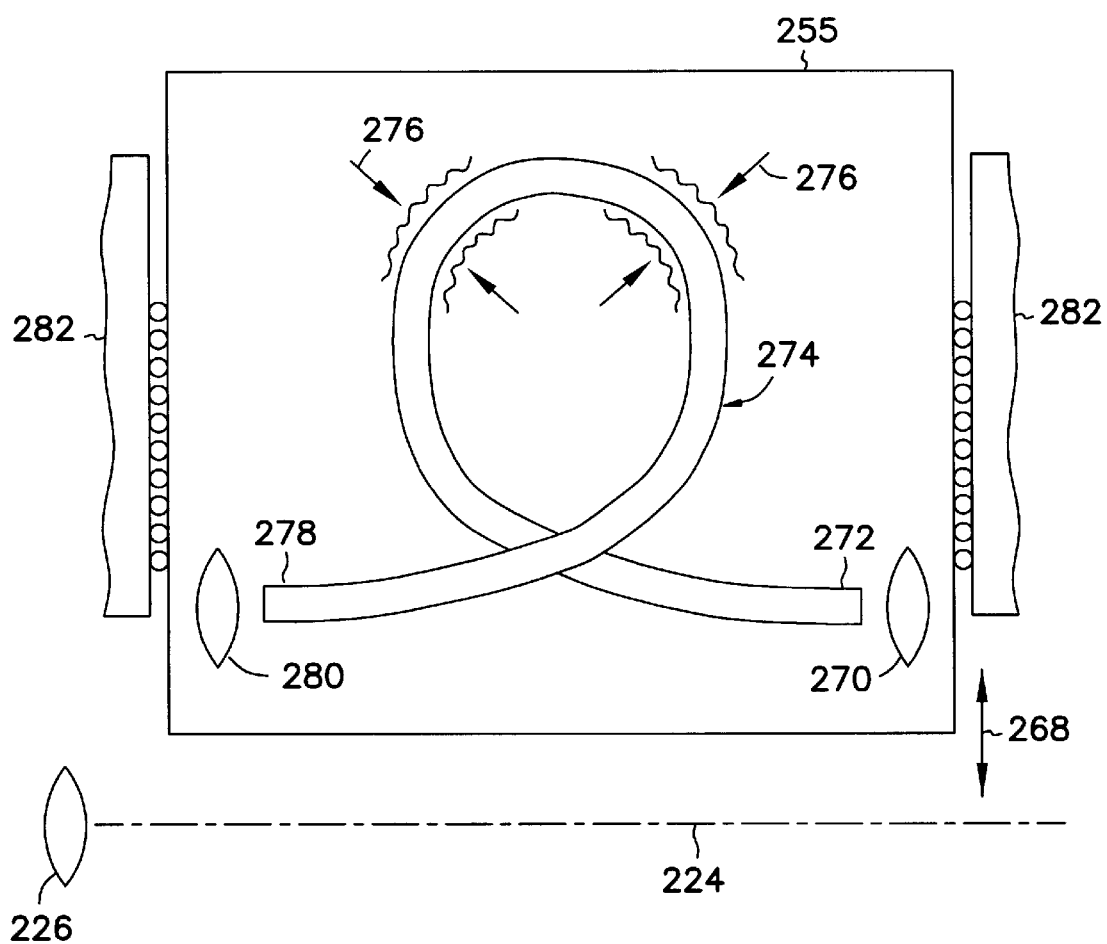

A schematic diagram of the beam scrambler 255 according to an embodiment of the present invention is shown in FIGS. 2C and D. The beam scrambler 255 is mounted on a motorized translation stage 282 that moves the beam scrambler 255 into or out of the path of the excitation beam along an axis 268. The beam scrambler 255 reduces the coherence, that is spreads and smears the laser speckle-pattern, of the excitation beam from the laser 220 when it is moved into the path of the excitation beam so that the specimen may be viewed directly through the oculars 254 as described below. The beam scrambler 255 includes an input lens 270 to receive the coherent excitation beam from the laser 220 along the excitation beam axis 224 and to launch the excitation beam to a first end 272 of a multimode optical fiber 274. The optical fiber 274 is oscillated by a vortexer (not shown) in the directions 276 to reduce the coherence of the excitation beam in the optical fiber 274. A less coherent excitation beam is collected from a second end 278 by an output lens 280 and transmitted to the converging lens 226 in the beam expander 230. The input lens 270, the optical fiber 274, and the output lens 280 spread the excitation beam to fill a field of view of the objective lens 231. When the specimen 244 is not being viewed directly through the oculars 254 the beam scrambler 255 is moved out of the path of the excitation beam by the motorized translation stage 282. FIG. 2D shows that the beam scrambler 255 may be moved out of the excitation beam axis 224 by the motorized translation stage 282 along the axis 268.

Figure 2E:
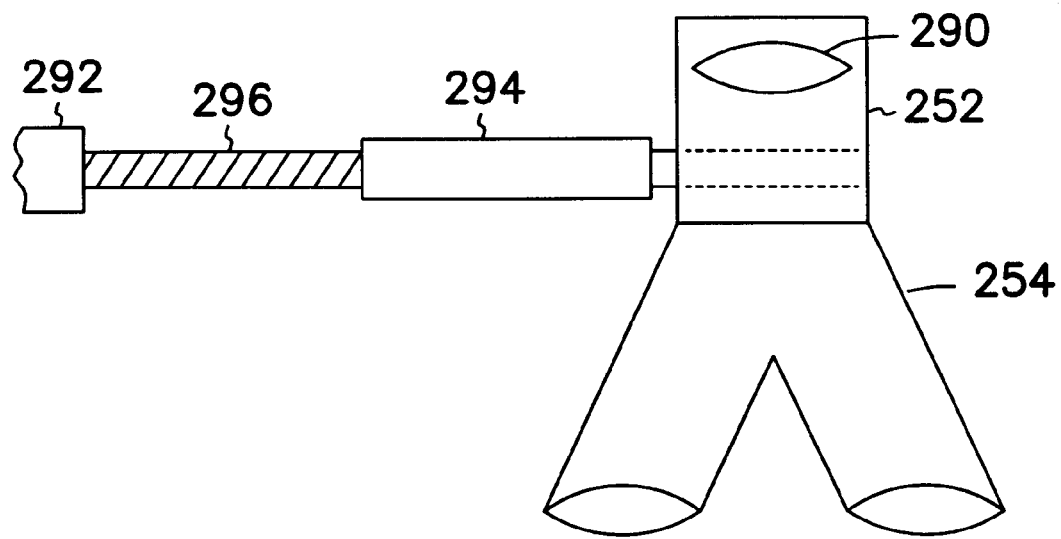

A schematic diagram of the trinocular microscope head 252 and the oculars 254 according to an embodiment of the present invention is shown in FIG. 2E. The trinocular microscope head 252 includes a tube lens 290 which focuses light from the specimen 244 toward the image pinhole 256. A motorized selector mechanism 292 is coupled to a trinocular diverter such as a prism 294 by a screw 296 for sliding the prism 294 inside the trinocular microscope head 252 to divert light from the specimen 244 toward the oculars 254 for direct viewing. The selector mechanism 292 rotates the screw 296 to move the prism 294 in response to signals from a control system (not shown).

The coherence of the excitation beam generated by the laser 220 causes a well-known speckle pattern when the light illuminates an irregular surface. The irregularities in the surface cause interference effects in an image of the surface. The speckle pattern interferes with a person viewing light from the specimen 244 directly through the oculars 254. For wide-field viewing of the collection of light rays directly, the illumination must be with a phase-scrambled collection of beams which excite an infinite number of specimen points in the specimen 244 faster than a response time of the human eye. The speckle pattern can be reduced or eliminated by reducing the coherence of the excitation beam with the beam scrambler 255 as described above. Actuation for the trinocular selector mechanism 292 and the motorized translation stage 282 is coordinated by the control system such that the prism 294 is slid into the trinocular microscope head 252 only when the beam scrambler 255 is in position and the optical fiber 274 is oscillated.

The confocal macroscope 200 according to the embodiment of the present invention may be used to generate images of a large biological tissue sample that has been stained with fluorescent dyes to enhance specific features such as making molecules of interest within a sample visible by binding antibodies to them and coupling the antibodies to fluorophores. Each of the fluorescent dyes will emit fluorescent light when excited by light of a particular wavelength from an excitation source which may be a multi-color or multi-line laser, and in particular a mixed-gas KrAr multicolor laser. The use of fluorescent dyes in multicolor confocal microscopy was described in U.S. Pat. No. 5,127,730 to Brelje et al., which is incorporated herein by reference. Brelje et al. describe an imaging system in which a biological tissue sample is stained with three different fluorescent dyes, each coupled to a different biochemical tag such as antibodies, antisense nucleotides, or calcium indicators. Each fluorescent dye absorbs light of one characteristic wavelength, the excitation maximum, which corresponds to one of the spectral lines of the excitation source. In the process of fluorescence, light of a characteristic longer wavelength, measured as the Stokes-shift, is emitted in response. Three spectral lines are produced by the mixed-gas KrAr multicolor laser and are directed toward the tissue sample to induce the fluorescence. The emitted fluorescent light may then be collected by the confocal macroscope 200 to generate the image 266.

Figure 3A:
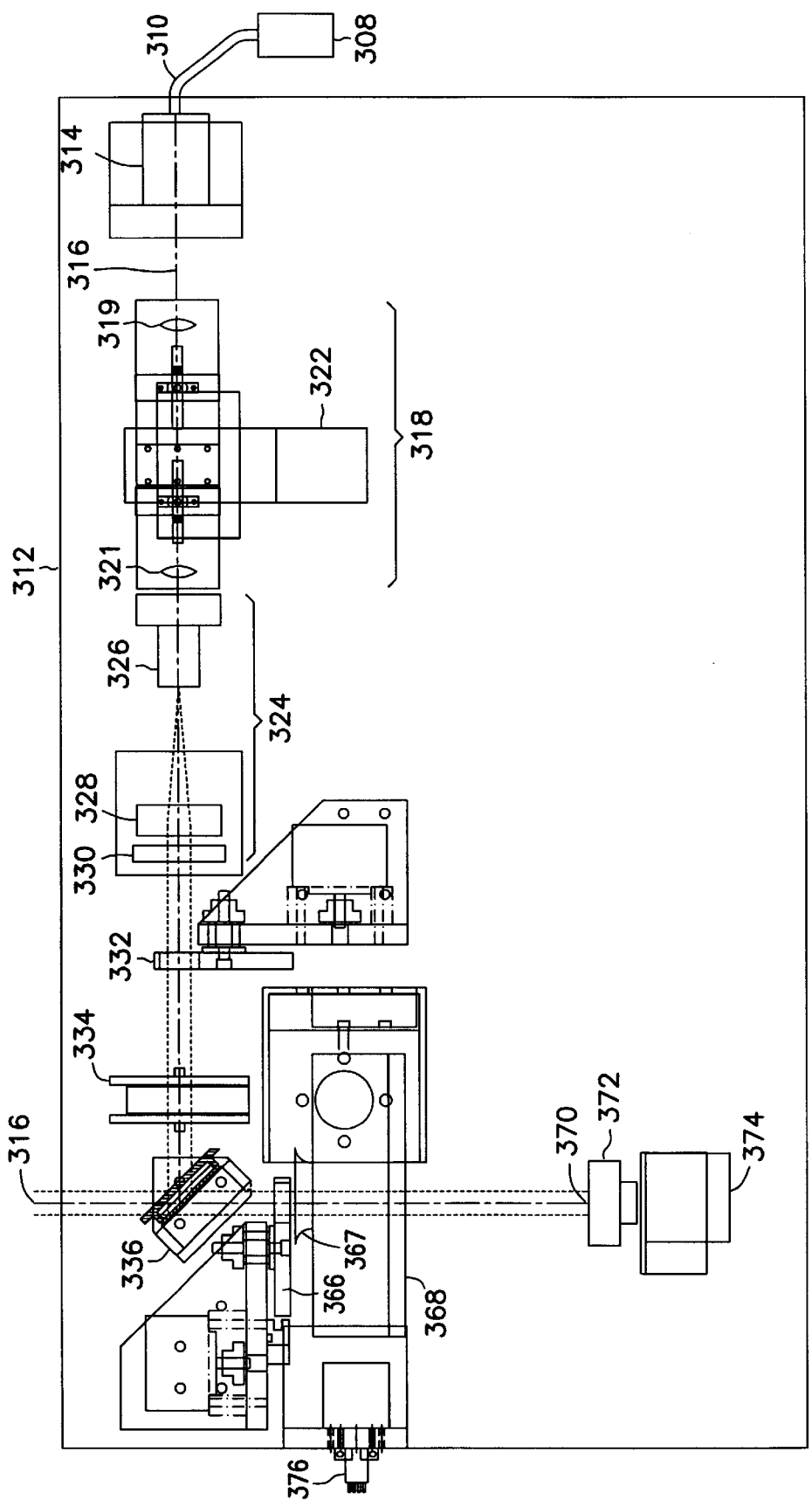
FIGS. 3A and B are drawings of a confocal macroscope according to an embodiment of the present invention.
Figure 3B:
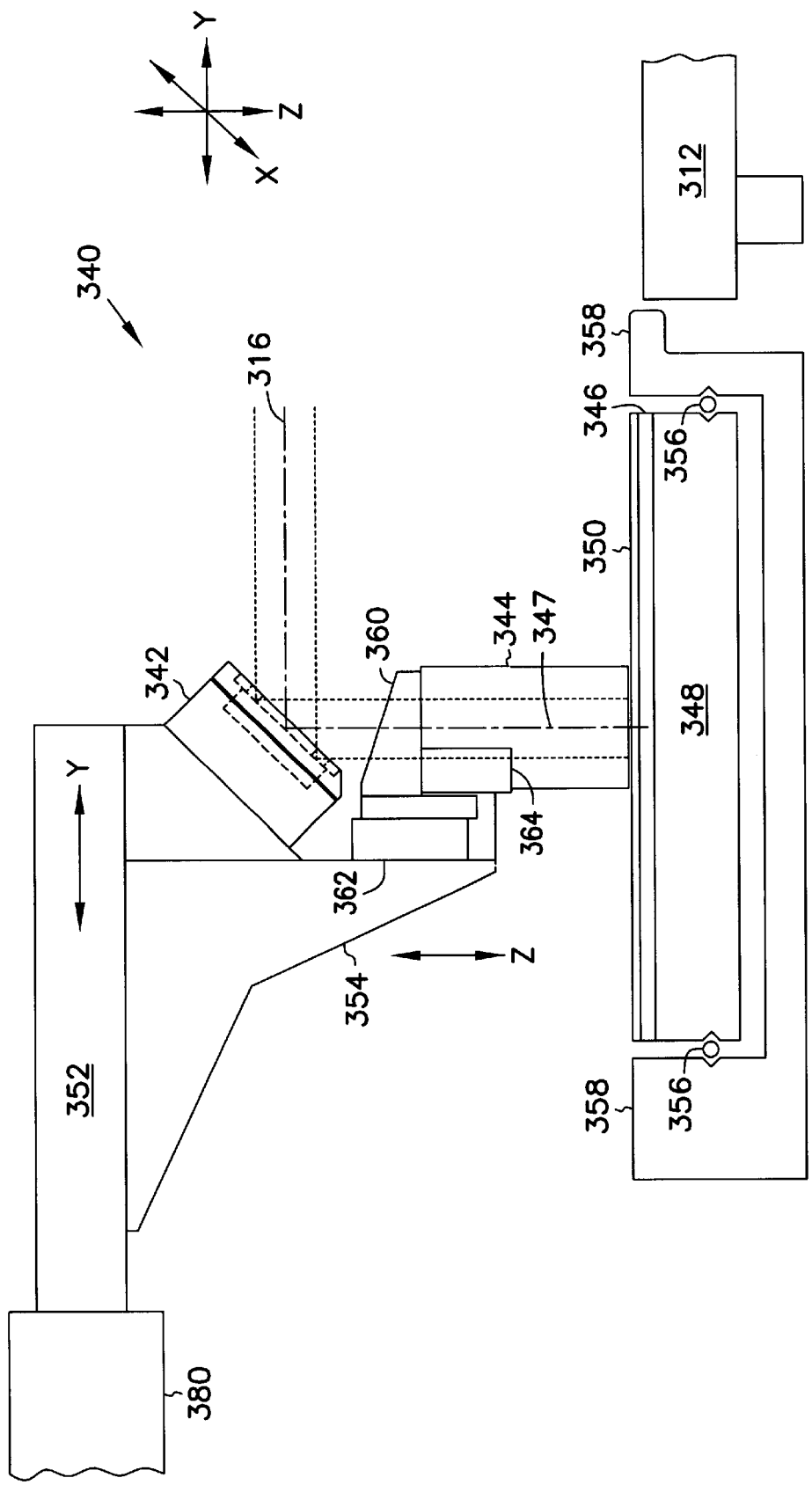
Figure 4C:
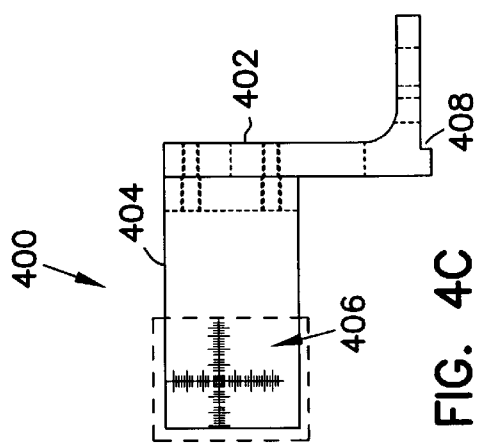
FIGS. 4A, B, C, and D are drawings of a beam alignment fixture according to an embodiment of the present invention.
Figure 4D:
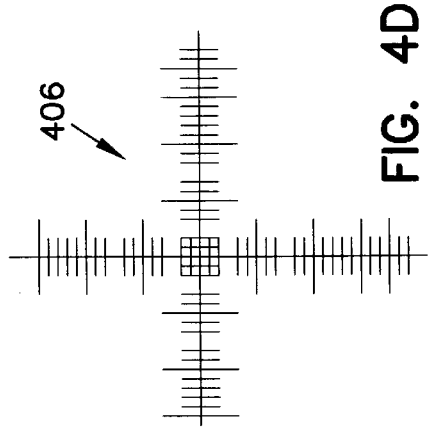
Figure 4A:
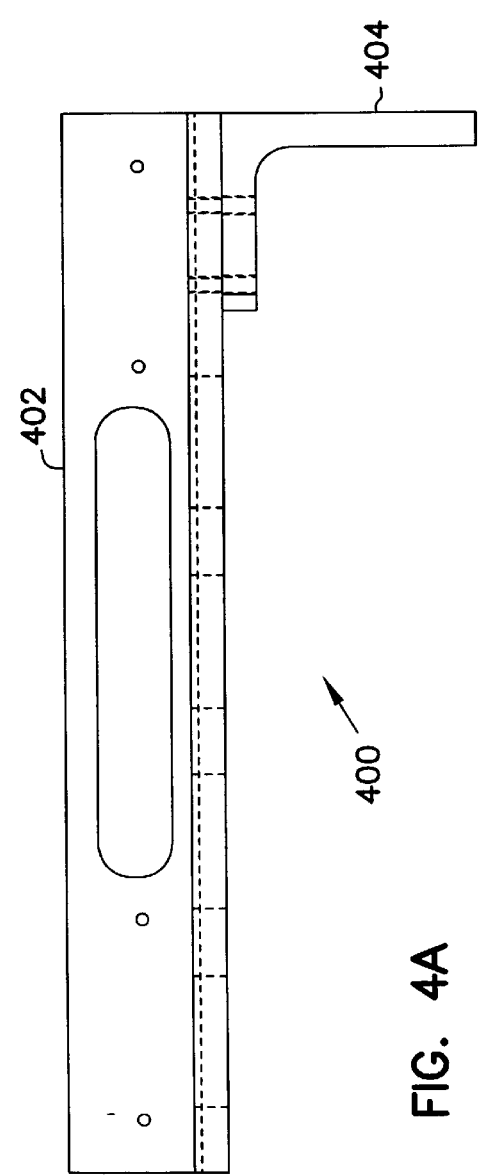
Figure 4B:
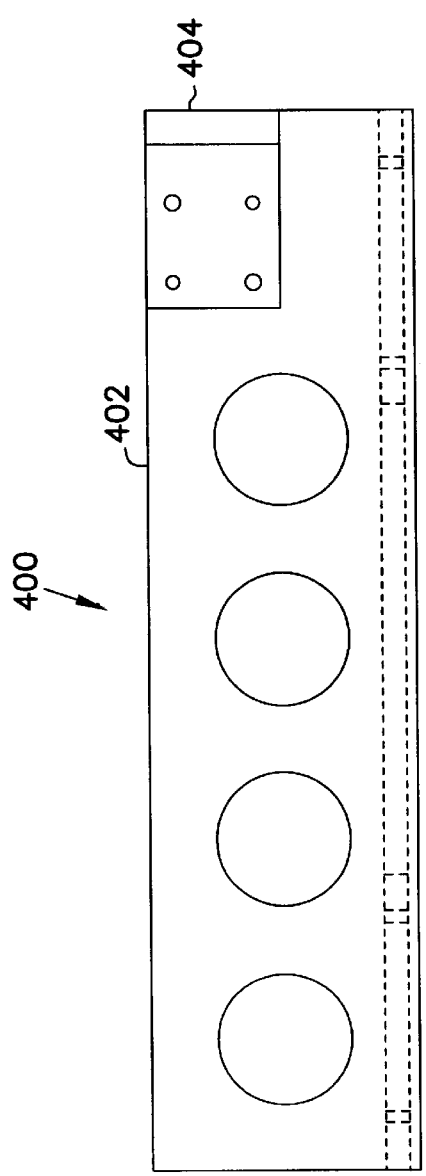

A confocal macroscope according to an embodiment of the present invention is shown in FIGS. 3A and 3B. A KrAr mixed-gas laser 308, specifically an Omnichrome 643-50RYB laser, delivers three collinear laser lines of blue, yellow, and red light rays in a coherent excitation beam simultaneously through a single mode optical fiber 310, to an optics board 312. In an alternate embodiment of the present invention the laser 308 may comprise a collection of separate lasers. The optics board 312 is a TMC Corporation model 78-special stainless steel optics board. An advantage of the KrAr mixed-gas laser 308 is that the blue, yellow, and red lines remain coherent and are well separated in wavelength for discerning light emitted by three different fluorescent dyes in a specimen using appropriate filters. The collinear lines are expanded, focused, and defocused as a single aggregate beam.

The optical fiber 310 is a single-mode armored fiber with an integrated chromatically corrected output lens aligned with the optical fiber 310 in a barrel 314. The barrel 314 is called an Optical Fiber Delivery System (FDS) which is produced by Point Source under a model number FDS-A-P-3-488/568/647-0.7-1.5 and includes a pair of FDS-4X-Z axis manipulators, three meters of armored polarization-preserving optical fiber and an FDS-MB mounting bracket. The output lens in the barrel 314 is positioned to recollimate the excitation beam from the laser 308. The barrel 314 is aligned by a multi-axis manipulator (not shown) and delivers the excitation beam to the optics board 312 such that the excitation beam is centered on an excitation beam axis 316. A beam scrambler 318 is positioned to slide into and out of a path of the excitation beam centered on the excitation beam axis 316 to reduce the coherence of the excitation beam. An input lens 319 in the beam scrambler 318 launches the excitation beam into a large-diameter multimode optical fiber (not shown), and the excitation beam is collected, refracted, and transmitted by an output lens 321. The optical fiber is held securely in chucks in the beam scrambler 318. The optical fiber is oscillated laterally with an amplitude of a few millimeters and at a rate of greater than 100 Hz to substantially reduce the sensation of a speckle pattern in an image of a specimen viewed directly by reducing the coherence of the excitation beam. The direct viewing of the image of the specimen will be described below. The optical fiber is oscillated by a test-tube vortexer (not shown) which the optical fiber is wrapped around. The vortexer is positioned at a distance away from the optics board 312 such that the vibrations are isolated. The beam scrambler 318 may be moved out of the path of the excitation beam upon a translation stage 322 actuated by a stepper motor via a lead screw drive (not shown). In an alternate embodiment of the present invention, the beam scrambler 318 may be placed beside a beam expander 324 on the translation stage 322 and both may be alternately moved into the path of the excitation beam in the same space. This embodiment of the present invention would considerably shorten the length of the confocal macroscope, at the expense of greater mechanical complexity and alignment sensitivity.

When the beam scrambler 318 is moved out of the path of the excitation beam the excitation beam is received by an input lens 326 of the beam expander 324. The input lens 326 is a Newport L-40x infinity corrected objective lens with a 5.0 mm focal length. The beam expander 324 includes an output lens 328 and expands and collimates the excitation beam from the laser 308. The output lens 328 is an achromatic cemented-doublet, Melles-Griot model number 01 LAL 017 with a 40 mm diameter×100 mm focal length. The input lens 326 of the beam expander 324 is an infinity-corrected, achromatic microscope objective lens. The beam expander 324 expands the excitation beam to over-fill the 11.7 mm diameter back-aperture of an objective lens in a scan-head by almost three times as described below. The collimated excitation beam from the beam expander 324 is truncated by an iris diaphragm 330, which is a fixed metal ring with an inner diameter of approximately 12.0 mm. The over-expansion and truncation of the excitation beam flattens a natural Gaussian radial profile of the excitation beam generated by the laser 308 into a flatter "top hat" shaped profile. The iris diaphragm 330 is placed as closely as possible to the output lens 328 to minimize stray light rays escaping around outer edges of the output lens 328.

The collimated excitation beam passes through one of three excitation filters which are bandpass filters positioned in a ring around an excitation filter wheel 332. The excitation filters are produced by Chroma Technologies having model numbers D488/10x, D568/10x, D647/10x, and the excitation filter wheel 332 is produced by New Focus Corp. The excitation filter wheel 332 is rotated by a rotary stepper motor to select one of the excitation filters to transmit a desired color and to block other colors in the collimated excitation beam. In an alternative embodiment of the present invention acousto-optic transform filters may be used as continuously variable solid-state color selectors/light intensity attenuators. A neutral density filter wheel 334 modulates the intensity of the collimated excitation beam which is then deflected by a triple-wavelength-pair interference-based polychroic beamsplitter 336 toward a scan-head 340 that is shown in FIG. 3B. The polychroic beamsplitter 336 is a 488/568/647 polychroic beamsplitter 50 mm round element from Chroma Technologies mounted in a custom monolithic flexure mount from Newport. In an alternate embodiment of the present invention the beamsplitter 336 may not be polychroic.

The collimated excitation beam received by the scan-head 340 from the beamsplitter 336 is reflected by a flat mirror 342 in the scan-head 340 toward an objective lens 344 which focuses the collimated excitation beam onto a focal point in an object plane in a specimen 346. The flat mirror 342 is a 100% reflective lambda/10 flatness mirror that is 25 mm round by Chroma Technologies. The objective lens 344 is an Olympus UAPO 20x infinity corrected objective lens with NA=0.75, WD=0.55 mm, a back-aperture=11.7 mm, a length=44.45 mm, and a field number=2. The back-aperture dictates the outer diameter of the collimated excitation beam and an emission beam described below. A central axis 347 passes through a geometric center of the objective lens 344. The specimen 346 rests on a specimen stage 348 and is topped by a sheet of cover glass 350. The specimen stage 348 may move the specimen 346 along an x-axis under the objective lens 344. The specimen stage 348, the scan-head 340, and the objective lens 344 are motorized to move along mutually orthogonal x, y, and z-axes, respectively.

The flat mirror 342 and the objective lens 344 are fixed to a scan-head stage 352 by a right-angle bracket 354. The scan-head stage 352 is movably mounted to a fixed base 380. The scan-head stage 352 moves the flat mirror 342 and the objective lens 344 relative to the optics board 312 along the y-axis orthogonal to the x-axis and parallel with the excitation beam axis 316 as the collimated excitation beam is reflected by the beamsplitter 336. The stages 348, 352 are identical ANORIDE stages of cast-iron crossed-roller bearing construction. The specimen stage 348 is shown movably supported by a set of bearings 356 and a frame 358. Position feedback control is provided for the stages 348, 352 by a control system and linear frictionless open glass scale optical position encoders (not shown) mounted inside each of the stages 348, 352. The encoders are 100 line/mm encoders produced by Heidenheim, and are used in conjunction with a 100x Anorad encoder interpolation circuit. A linear DC-brushless ANOLINE servo motor (not shown) is mounted along a center-line inside of each of the stages 348, 352 to provide balanced, frictionless propulsion according to signals from the control system. Both of the stages 348, 352 have small loads so either is capable of providing a scanning or a stepping motion. The stages 348, 352 and the servomotors are produced by the Anorad Corporation. Alternative embodiments of the present invention may include stages suspended on a cushion of air, floating on a fluid or suspended magnetically. The stages may be moved by pressurized air, hydraulic fluid, or piezoelectric friction motors.

The objective lens 344 may be moved along the z-axis, also called a focus axis, that is normal to a surface of the cover glass 350 and the specimen 346 and orthogonal to the x and y-axes. The objective lens 344 is mounted to a barrel support 360 protruding from a steel translation stage 362. The steel translation stage 362 is driven by a piezoelectric actuated lead-screw focus motor (not shown) that is controlled by the control system. The focus motor is a New Focus Micrometer Replacement Actuator. A feedback signal indicating a position of the objective lens 344 is provided by a non-contact capacitive distance sensor 364 mounted on the right-angle bracket 354. The capacitive distance sensor 364 is an HB sensor with a DMT-10 linearizing amplifier produced by Lion Corporation. The capacitive distance sensor 364 monitors the distance between itself and a tab which protrudes from the barrel support 360 and acts as a target.

The collimated excitation beam is reflected by the flat mirror 342 so that the excitation beam axis 316 is maintained coaxial with the central axis 347 of the objective lens 344. When the scan-head 340 is moved along the y-axis relative to the optics board 312 the infinity space in which the collimated excitation beam exists expands and contracts as the excitation beam remains collimated. The flat mirror 342 preserves the parallel rays in the collimated excitation beam as it is reflected toward the objective lens 344. The flat mirror 342 moves parallel with the excitation beam axis 316 along the y-axis and the reflected collimated excitation beam remains stationary relative to the central axis 347 of the objective lens 344.

The scan-head 340 is mechanically coupled to the specimen stage 348 through a granite superstructure described below, and an indirect distance between the objective lens 344 and the specimen 346 is monitored and maintained. The capacitive distance sensor 364 has a linear range of fully 500 microns, whereas the piezoelectric actuated lead screw has a range of many millimeters. The capacitive distance sensor 364 can easily be raised or lowered between scans to accommodate different thicknesses of the specimen 346. In an alternative embodiment of the present invention, direct closed-loop feedback monitoring of the distance between the objective lens 344 and the cover glass 350 may be done using an optical "through-the-lens" approach.

The specimen 346 is stained with up to three fluorescent dyes, one of which will fluoresce with a Stokes-shifted wavelength when excited by light of one of the colors blue, yellow, or red generated by the laser 308 and selected by the excitation filter in the excitation filter wheel 332. The emanating light follows a path that is collinear with a line traced by the collimated excitation beam focused on the specimen 346 by the objective lens 344. Photons in the fluorescent light emitted by the dye that enter an acceptance cone of the objective lens 344 are collected and deflected by the flat mirror 342 back toward the optics board 312, where they are transmitted by the beamsplitter 336 while most other wavelengths of light are blocked.

An emission filter wheel 366 behind the beamsplitter 336 selectively transmits the Stokes-shifted wavelength of the fluorescent light emitted by the dye in the specimen 346. The emission filter wheel 366 includes three emission filters each of which is a bandpass filter that transmits one of the Stokes-shifted wavelengths emitted by the specimen 346. The emission filters are produced by Chroma Technologies having model numbers HQ525/50, HQ605/50, HQ700/50, and the emission filter wheel 366 is produced by New Focus Corp. The emission filters in the emission filter wheel 366 correspond respectively to the excitation filters in the excitation filter wheel 332 which is a mirror image of the emission filter wheel 336. The beamsplitter 336 remains fixed and transmits all of the Stokes-shifted wavelengths that may be emitted by the specimen 346.

The fluorescent light is transmitted to a color-corrected tube lens 367 in trinocular microscope head 368 which is matched to the objective lens 344. The trinocular microscope head 368 an Olympus U-TR30 Trinocular Head with two 2-U1002 WH10X-2 eyepieces. The tube lens 367 focuses the photons of the fluorescent light on an image pinhole 370 in a plate 372 forming a conjugate image plane with the focal point in the specimen 346.

The excitation filter wheel 332 and the emission filter wheel 366 are each actuated by a rotary stepper motor controlled by the control system and rotate in concert between one of three respective pairings of the excitation and emission filters in a coupled manner; a blue excitation filter and a green emission filter, a yellow excitation filter and an orange emission filter, and a red excitation filter and an infrared emission filter.

Photons passing through the image pinhole 370 are detected by a wide-bandwidth or red-sensitive PMT 374 that generates a signal indicating the detection of the photons. The PMT 374 is a Hamamatsu HC-120-05 MOD PMT with an R6357 tube, a 10 MHz amplifier, and a low-noise multiplier. In an alternative embodiment of the present invention the photons passing through the image pinhole 370 may be detected by another type of photodetector such as a photodiode. The signal is processed by the control system to generate an image of the specimen 346.

As discussed earlier, the fluorescent light from the specimen 346 may be viewed directly through a pair of oculars (not shown) in the trinocular microscope head 368 if the beam scrambler 318 is moved and activated to defocus the coherent excitation beam from the laser 308. The fluorescent light is diverted within the trinocular microscope head 368 toward the oculars by sliding a trinocular diverter such as a prism (not shown) into the trinocular microscope head 368. The prism is slid into and out of the trinocular microscope head 368 by a selector arm (not shown) and a hollow-core stepper-motor 376 that is mounted coaxial to the selector arm and a non-contact limit switch. The motion of the selector arm may be controlled with software in the control system.

The confocal macroscope also effectively works in a reflectance mode if the specimen 346 is reflective. In the instance of reflectance imaging, the specimen 346 is not stained with fluorescent dye. The excitation and emission filters are removed, and the reflected light from the specimen 346 either effectively leaks through the beamsplitter 336 or alternatively passes through a partially-silvered beamsplitter.

Optical elements in a path of the excitation beam are optically and optomechanically aligned using an excitation path optical alignment fixture 400 shown in FIGS. 4A–4D. The alignment fixture 400 comprises a first L-bracket 402 to which a second L-bracket 404 is fixed. The second L-bracket 404 has a visible target 406 inscribed on its surface that faces the coherent excitation beam when the first L-bracket 402 is attached to a front edge of the specimen stage 348, as positioned with precision locator corner 408. The optical elements on the optics board 312 from the optical fiber 310 and up to, but not including, the beamsplitter 336 may be aligned with the target 406 when the alignment fixture 400 is attached in this manner.

The beamsplitter 336 is aligned with a scan-head beam target (HBT) 500 shown in FIGS. 5A, B, C, and D. The HBT 500 has a front face 502 inscribed with a target 504 and is mounted to the scan-head 340 through two mounting holes 506. The beamsplitter 336 is aligned in the following manner. With the HBT 500 attached to the scan-head 340, two angular axes in a flexure mount of the beamsplitter 336 are adjusted until the scan-head 340 may traverse its full range of motion while an image of the collimated excitation beam remains stationary on the HBT 500. The collimated excitation beam deflected by the beamsplitter 336 is then parallel with the path of the scan-head 340.

The repeatability and parallelism of the scan-head stage 352 with respect to the specimen stage 348 can be checked in three Cartesian planes using a profiling and stage alignment evaluation feature of the confocal macroscope. The profiling mode will also profile and produce a contour map of any relatively flat specimen 346 mounted on the specimen stage 348. Profiling is done using the capacitive distance sensor 364. To perform profiling, the capacitive distance sensor 364 is removed from the right-angle bracket 354, and a probe-extender-bar (not shown) is inserted between the right-angle bracket 354 and the capacitive distance sensor 364 so that the capacitive distance sensor 364 is positioned a short distance above the specimen stage 348. The probe-extender bar has three sets of holes to allow the capacitive distance sensor 364 to be positioned in the three orthogonal orientations. A vertical orientation places the capacitive distance sensor 364 parallel to the surface of the specimen stage 348, allowing it to monitor the flatness of the specimen stage 348. When the capacitive distance sensor 364 is mounted so that its sensor faces frontward or rearwards, it can monitor the straightness along the x-axis as shown in FIG. 3B. The capacitive distance sensor 364 is mounted on an extender bar (not shown) with its sensor facing sideways to monitor the straightness along the y-axis. For the x and y-axis straightness repeatability evaluations, a bar (not shown) with a smooth vertical face is mounted upon the specimen stage 348 in the appropriate orientation.

The control system controls the motion and performs distance data collection. Points in an arbitrarily selected rectangular grid over the surface of the specimen stage 348 are scanned. The plane can be rescanned for a specified number of iterations to attain a desired statistical confidence level. Scan velocity may also be specified. A serpentine scan pattern is reversed for even planes versus odd planes, i.e., the first stroke is always rearwards, and the planes alternate from leftwards stepping to rightwards stepping, thus allowing directional sensitivity to be gauged. An example of a 2-stroke plane scan procedure is shown below:

(A) Stroke rearwards once.
(B) Step leftwards once.
(C) Stroke frontwards.
(D) If not at edge, then step leftwards one row.
(E) Repeat until the edge of scan area is reached.

A new plane is scanned according to the following procedure:

(A) Without stepping, stroke rearwards, retracing the most recent specimen-stage 348 location.
(B) Step rightwards.
(C) Stroke frontwards.
(D) If not done, then step rightwards by one row.
(E) Repeat until the edge of scan area if reached.

Data is collected "on-the-fly" at sample points with space interspersed. As with light intensity scans, data is saved in files in the control system, one file per plane.

The confocal macroscope according to the embodiment of the present invention including the capacitive distance sensor 364 is capable of a resolution of about 100 nanometers distance over a sensing area of about 5 mm laterally in the profiling and stage alignment evaluation feature described above. Its range of distance is about ½ mm. Its great advantage is its high speed (several kHz) and completely non-contact sensing ability. The motion of the two stages 348, 352 and the specimen 346 are completely unperturbed. The capacitive distance sensor 364 is also very mechanically stable, simple in design, temperature-compensated, and is relatively low in cost.

Other profiling sensor configurations may be used for finer lateral resolution. A stylus connected to a force sensor may be used, but this arrangement has the drawbacks of slower speed and considerable contact force. Other methods include an inductive sensor, an optical focus spot-based reflectometer, an interferometer, sonar, a mechanical strain gauge, and a thermal probe. An atomic force and scanning-tunneling styli may be mounted to the confocal macroscope scan-head 340, which would be able to do non-contact profiling, albeit with the trade-offs inherent to these techniques. The probes may also be mounted in the barrel support 360 or in an adapter piece which is switched-in at the location of the barrel support 360. The specimen 346 may be optically scanned, the objective lens 344 switched for a scanning-tunneling probe, and the scan repeated.

Figure 6:
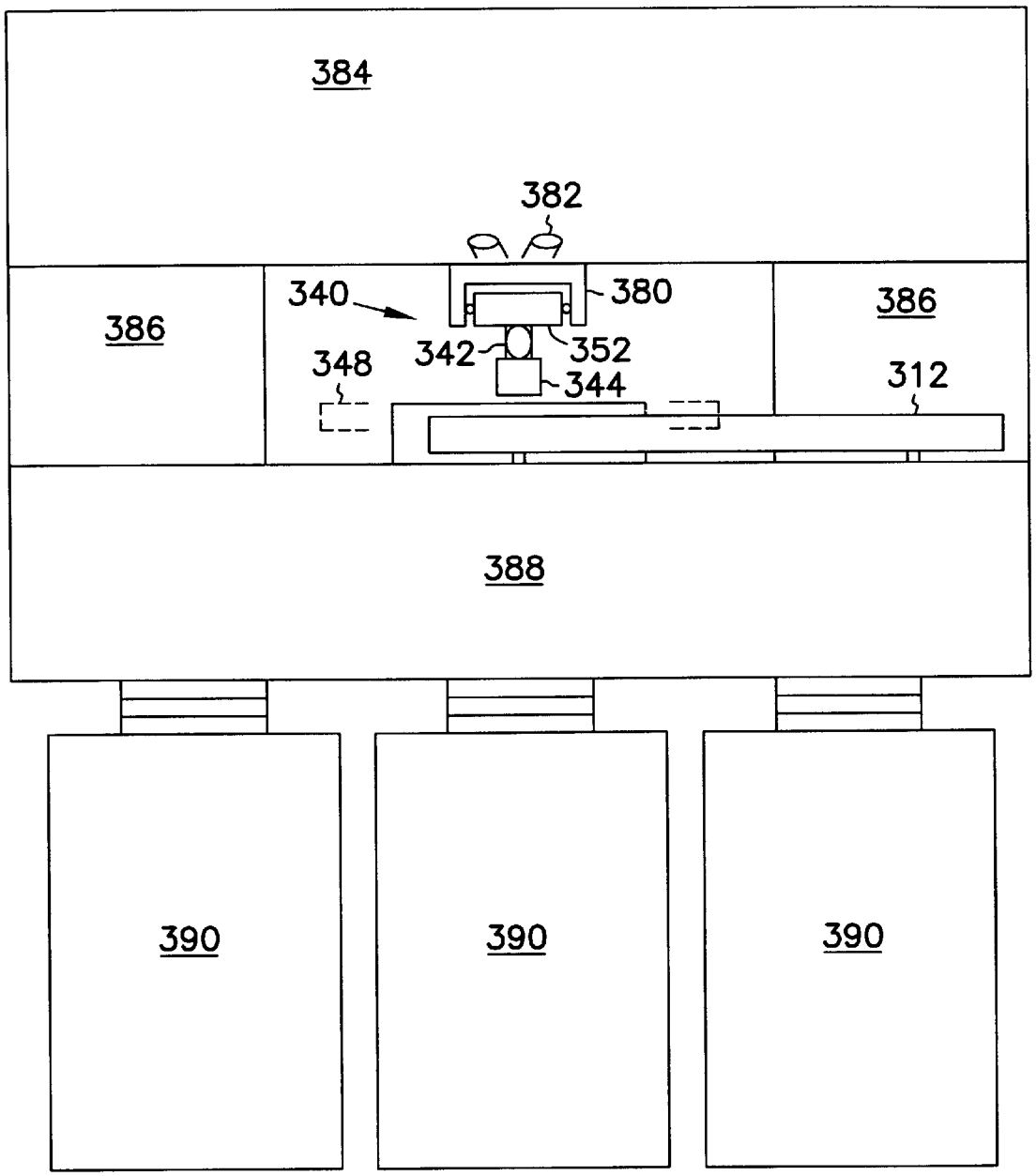
FIG. 6 is a front view of a confocal macroscope according to an embodiment of the present invention.

A front view of the confocal macroscope is shown in FIG. 6. A substantial portion of the optical elements on the optics board 312 and the scan-head 340 are not shown for purposes of clarity. The elements shown are the objective lens 344, the flat mirror 342, the scan-head stage 352 movably mounted to the fixed base 380, and the oculars 382 which were not shown in FIG. 3A. Oculars 382 are attached to the trinocular microscope head 368 shown in FIG. 3A in a manner similar to the attachment of the oculars 254 to the trinocular microscope head 252 shown in FIGS. 2A and 2E. The optics board 312 and the scan-head 340 are supported by a structure including a cross bridge 384, support pillars 386, a system base 388 and legs 390 comprising laboratory grade granite. The granite acts to dampen vibrations and to maintain mechanical alignment of all of the elements in the confocal macroscope. In addition, the optics board 312 is a vibration-dampening, stainless steel breadboard of honey-comb construction produced by TMC Inc.

Figure 7:
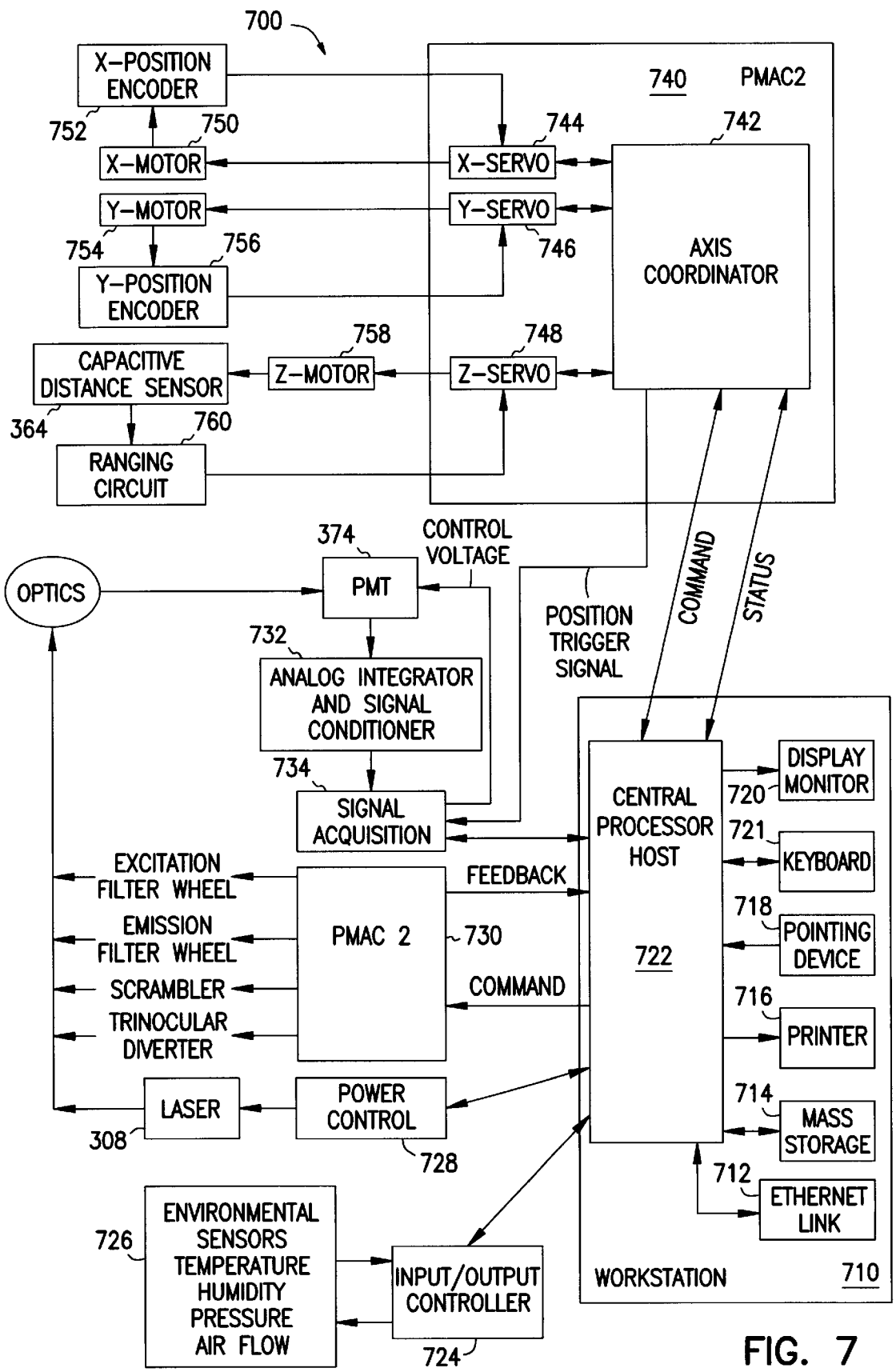
FIG. 7 is a schematic diagram of a control and data processing system for the confocal macroscope according to an embodiment of the present invention.

A schematic diagram of a control and data processing system 700 for the confocal macroscope is shown in FIG. 7 according to an embodiment of the present invention. The system 700 includes a multi-processor PC workstation 710 and peripheral elements including a high speed Ethernet link 712, a multi-channel Redundant Arrays of Independent Disks (RAID) controller for a mass storage device 714, a printer 716, a pointing device 718 such as a mouse or a joystick, a fast graphics display board which drives a display monitor 720, and a keyboard 721. All of the peripheral elements are coupled to a central processor host 722 in the system 700.

The host 722 exchanges signals with an input/output controller 724 that monitors a plurality of environmental sensors 726 that sense several parameters including temperature, humidity, air pressure, and air flow. The host 722 sends a laser control signal to a power control circuit 728 that provides power to the laser 308 to control the intensity of the coherent excitation beam. The host 722 exchanges command and status feedback information with an all-digital servo motion controller, specifically a Delta Tau PMAC2 system 730, 740. The PMAC2 system 730, 740 is shown as two PMAC2 blocks 730, 740 in FIG. 7. The PMAC2 block 740 controls the dynamic scanning movement along the x, y, and z-axes and the PMAC2 block 730 controls the movement of elements between scans. The PMAC2 system 730, 740 is fixed on a board in a peripheral slot of the workstation 710, and has direct memory access (DMA) capability and accessory interface boards in a separate enclosure. The PMAC2 system 730, 740 is produced by Delta Tau and has one accessory 8E with two servo motor channels and three accessory 8S with six stepper channels. The PMAC2 block 730 controls the motors moving the beam scrambler 318, the excitation filter wheel 332, the emission filter wheel 366, and the stepper-motor 376 moving the trinocular diverter.

The PMT 374 generates a signal with a pre-amplifier having a bandwidth of 10 MHZ indicating the intensity of the photons detected through the image pinhole 370. The signal is further amplified and integrated by an analog integrator and signal conditioner circuit 732. The signal from the circuit 732 is digitized by a Datel PCI416E signal acquisition board 734 at 12-bit resolution and up to 2 million samples/second. The data is collected in an automated and unattended manner. The digitized data streams into the main memory of the host 722 and the mass storage device 714 via DMA transfer. The signal acquisition board 734 provides a control voltage to modulate a sensitivity or gain of the PMT 374.

Three servo channels in an axis coordinator circuit 742 in the PMAC2 block 740 control the motion of the scan-head 340, the specimen stage 348 and the objective lens 344 based on status and instructions exchanged with the host 722. The motors and position encoders that were not shown in FIG. 3B are represented schematically in FIG. 7. The axis coordinator circuit 742 exchanges signals with an x-servo 744, a y-servo 746, and a z-servo 748. The x-servo 744 provides Proportional-Integral-Derivative (PID) control for the specimen stage 348 along the x-axis in a control loop also including a linear DC-brushless servo motor 750 and a position encoder 752. The y-servo 746 provides PID control for the scan-head stage 352 along the y-axis in a control loop also including a linear DC-brushless servo motor 754 and a position encoder 756. The z-servo 748 provides PID control for the translation stage 362 along the z-axis in a control loop also including the piezoelectric actuated lead screw focus motor 758, the capacitive distance sensor 364, and a ranging circuit 760. All seven of the axes controlled by the PMAC2 system 730, 740 also have fully programmable S-curve acceleration trajectories. S-curves provide the smoothest starting and stopping such as to protect the scan-head optics.

In an alternative embodiment of the present invention the host 722 may perform a digital integration of digital data received from the signal acquisition board 734 and the circuit 732 does not perform an integration of the analog signal from the PMT 374.

Figure 8:
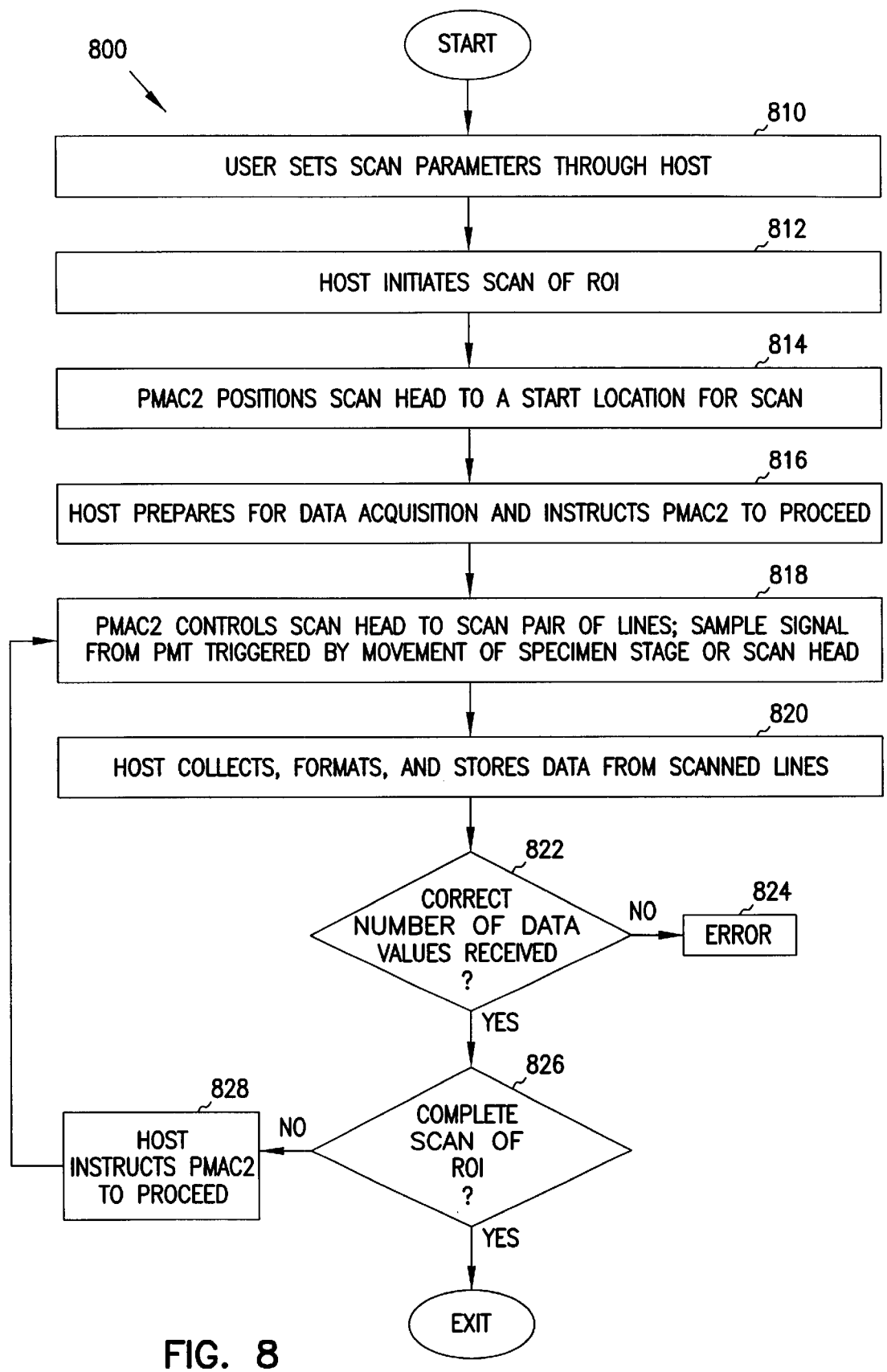
FIG. 8 is a flow chart of a scan method according to an embodiment of the present invention.

The host 722 and the PMAC2 block 740 cooperate to carry out a scan of a region of interest (ROI) in the specimen 346 according to a scan method 800 shown in a flowchart in FIG. 8. Before scanning the specimen 346 may be prepared with dye. However, many specimens are naturally reflective, luminescent, or fluorescent and do not need the addition of dye. The specimen 346 is mounted on a substrate, typically a glass slide. The cover glass 350 is placed on top and the specimen 346 is secured with specimen mounting bars against a raised locator corner (not shown). In 810 a user may set parameters for the scan through a user interface in the host 722 such as the keyboard 721, and in 812 the host 722 initiates a scan of the ROI. The ROI may be selected in the beam scrambled-direct view mode in which a user may view the specimen 346 through the oculars 382 and employ the pointing device 718 to move to and click on the ROI's boundary edges. In 814 the PMAC2 740 positions the scan-head 340 and, more specifically, the objective lens 344 to a starting location over the specimen 346 as specified in the scan parameters. In 816 the host 722 prepares for data acquisition and instructs the PMAC2 740 to proceed. In 818 the PMAC2 740 controls the scan-head 340 to scan a pair of lines in a raster pattern, and the signal acquisition board 734 samples the integrated signal from the PMT 374 following position-generated triggers from the PMAC2 740 indicating a movement of the specimen stage 348 or the scan-head stage 352. The PMAC2 740 scans one pair of lines at a time, and each pair of lines is scanned by a rearward stroke of the scan-head stage 352 followed sequentially by an adjacent forward stroke. Thus, there will always be an even number of strokes, also called frames, in a scan of a ROI. The host 722 collects, formats, and stores the data values from the scanned lines in 820, and the data values are placed in the mass storage device 714 through DMA. The host 722 accommodates the bidirectional data collection by maintaining an order of the rearward values, but reversing the order of the data for the frontward stroke. Thus the host 722 only stores data values of a rearward orientation. In 822 the host 722 determines if a correct number of data values have been received. If an insufficient number of data values have been received for the scanned lines then an error is indicated in 824 and the method 800 is aborted. If a sufficient number of data values have been received then the host 722 determines if the entire ROI has been scanned in 826, and if so the method 800 is successfully completed. If the ROI has not been fully scanned then the host 722 loops back up to 818 and thus instructs the PMAC2 740 to proceed with the scan in 828, and the PMAC2 740 scans another pair of lines in the ROI in 818.

The shape of the ROI is typically rectangular, but may be of any arbitrary shape. Upon scanning in one object plane the scan-head 340 can be moved along the z-axis normal to the specimen stage 348 to a different object plane to collect data from an adjacent slice through the specimen 346. A scan can be retraced to re-examine a given object plane using different excitation-emission color filter pairs, or to examine volume elements within planes above or below volume elements of a preceding scan.

The host 722 has the capability to assemble complete three-dimensional image sets of the specimen 346 following a scan through several object planes. The host 722 also features tools such as image rotation and image overlay. Image overlay can be used to show spatial relationships between neurotransmitters, neural receptors, mRNA precursors, etc., in the specimen 346 where each is labeled with a differently colored fluorescent dye. Typical specimens 346 that may be used with the confocal macroscope include, but are not limited to, immunohistochemically stained mammalian brain tissue slices. Such brain tissue-slices can be up to 200 micrometers thick and are sandwiched between a 170 micrometer cover glass 350 and a 1 mm mounting slide. The specimens 346 are highly translucent, allowing optical examination throughout their volume. A specimen 346 of brain tissue scanable by the macroscope according to the embodiments of the invention may have lateral dimensions of up to 18×18 cm. Such specimens 346 may be highly deformable and slippery, while others are mounted with acrylic and are thus mechanically stable.

A confocal macroscope according to the embodiments of the present invention described above is a highly-automated "hybrid-stage-scanning" confocal epi-illumination microscopic imaging system capable of collecting seamless data sets at sub-micrometer resolution over multi-centimeter areas of a specimen. A modified stage-scanning approach is implemented such that rapid scanning is done without excessive jostling of the specimen and optics, and data is rapidly collected from large fields of view. This is accomplished by moving the specimen stage in small steps at very low accelerations, while moving the scan-head stage at high speed and high, yet smooth s-curve acceleration. The confocal macroscope produces images of improved quality, shows good system quantum efficiency with less spatial distortion and improved spatial registration in the images produced. There are fewer losses, hence greater quantum efficiency, because the confocal macroscope has fewer optical elements. The confocal macroscope is a hybrid imaging system with a scan-head reciprocating in infinity space that can readily access a large volume seamlessly.

In the confocal macroscope according to the embodiment of the present invention the collimated beam's infinity space is used to decouple the motion of the objective lens optics in the scan-head from the bulk of the fixed, precision-aligned optics on the optics board. The scan-head reciprocates coaxially within this infinity space. By keeping the incoming (excitation) and outgoing (emission) light collimated except for the small region between the specimen and the objective lens, the motion of the scan-head and the objective lens relative to the fixed optics (which constitute the bulk of the confocal macroscope) does not change the location of the focal point within the specimen nor at the confocal pinhole.

The confocal macroscope is particularly suited for imaging of complex biological specimens where microscopic resolution is required while preserving macroscopic feature relationships, hence the name confocal macroscope. Such specimens possessing critical variation at both the fine and coarse levels of resolution include: the brain, developing embryos, electrophoretic gels, "gene-on-a-chip" microarrays, microelectronic integrated circuit chips, flat panel displays, and, of clinical relevance, pathological tissues. The absence of rotary components, the vibration damping materials and the minimal number of parts in the confocal microscope yield a combination of rapid, precise and repeatable motion. The confocal macroscope is inherently flat-fielded to aid in generating images of histological biological specimens and DNA chips. The confocal macroscope also embodies an integrated apparatus for viewing the specimen directly using a "scrambled" laser illumination light source and a software system for controlling the confocal macroscope.

Although specific embodiments have been illustrated and described herein, it will be appreciated by those skilled in the art having the benefit of this description that any equivalent arrangement may be substituted for the specific embodiments shown. For example, the confocal macroscope may use any source of a coherent excitation beam including a femtosecond pulsed laser for multiple-photon illumination. The present invention is therefore limited only by the claims and equivalents thereof.

What is claimed is:

1. An imaging system comprising:
   an x stage movable on an x-axis;
   a source of a collimated excitation beam centered on a beam axis and defining infinity space;
   a scan-head comprising a deflector mirror to bounce the collimated excitation beam normal to the respective x stage and an objective lens, the objective lens having a central axis aligned coaxial with the beam axis of the collimated excitation beam, the scan-head being movably positioned to stretch the infinity space and to focus the collimated excitation beam on a focal point in an object plane over the x stage and to receive light emitted or reflected from the object plane, the objective lens being movable along a z-axis by a focus mechanism and the scan-head being movable upon a y-axis orthogonal to the x and z-axes and relative to the x stage and relative to the source while the central axis of the objective lens remains coaxial with the beam axis of the collimated excitation beam;
   a detector pinhole to receive light emanating from the focal point in the object plane; and
   a photodetector behind the detector pinhole to receive the light and to generate a signal based on the light.

2. The imaging system of claim 1 wherein:
   the x stage includes a propulsion source to move the x stage on the x-axis;
   the scan-head includes a propulsion source to move the scan-head on the y-axis;
   the source of the collimated excitation beam comprises a multicolor laser and a source pinhole; and
   the photodetector comprises a PMT or a photodiode.

3. The imaging system of claim 1, further comprising:
   an integrated automatic wide view laser illuminated scrambler/spreader motorized to move in and out of an excitation path;
   a beam expander on the beam axis in the source to expand and collimate the collimated excitation beam;
   a polychroic beamsplitter having multiple passbands and corresponding reflective bands to direct the collimated excitation beam from an illumination axis parallel to the x-axis of the x-stage toward the y-axis;
   a linear motor in the scan-head to move the scan-head along the y-axis;
   a linear motor in the x stage to move the x stage along the x-axis; and
   a control system to control the focus mechanism to move the objective lens to obtain the focal point in the object plane, to move the scan-head and the x stage alternately or simultaneously to trace out a serpentine, raster, or other pattern with the focal point, and to collect and store data automatically and unattended.

4. An imaging system comprising:
   a multicolor laser to generate a collimated excitation beam centered on a beam axis and occupying infinity space;
   a polychroic beamsplitter to reflect the collimated excitation beam;
   a scan-head comprising a flat mirror movably positioned to reflect the collimated excitation beam from the polychroic beamsplitter toward an objective lens having a central axis coaxial with the beam axis of the collimated excitation beam, the objective lens being positioned along a z-axis to focus the collimated excitation beam on a focal point in an object plane in a specimen on a specimen stage;
   a detector pinhole to receive light emanating from the object plane; and
   wherein:
      the scan-head comprises the objective lens movable along the z-axis by a piezoelectric actuated leadscrew focus motor, the scan-head being movable by a linear motor along a y-axis orthogonal to the z-axis relative to the polychroic beamsplitter while the central axis of the objective lens remains coaxial with the beam axis of the collimated excitation beam in infinity space, the scan-head being movable along the y-axis to stretch the infinity space; and
      the specimen stage comprises a linear motor to move the specimen stage along an x-axis orthogonal to the y and z-axes.

5. The imaging system of claim 4 further comprising a control system to control the focus motor to move the objective lens to obtain the focal point in the object plane, to move the scan-head and the specimen stage alternately or simultaneously to trace out a serpentine, raster, or other pattern with the focal point, and to collect and store data automatically and unattended.

6. The imaging system of claim 5 wherein:
   the multicolor laser comprises a krypton-argon ion laser; and
   the imaging system further comprises:
      a beam expander on the beam axis to expand and collimate the collimated excitation beam;

a tube lens positioned to receive the light from the object plane, the light to be transmitted through the objective lens and the polychroic beamsplitter, the tube lens to focus the light on the detector pinhole;

a PMT coupled to the detector pinhole to detect the light received by the detector pinhole; and a mass storage device to store the data collected by the control system from the light detected by the PMT.

7. An imaging system comprising:

a specimen stage;

a source of a collimated excitation beam centered on a beam axis; and a scan-head comprising an objective lens having a central axis coaxial with the beam axis of the collimated excitation beam, the scan-head being movably positioned to focus the collimated excitation beam on a focal point in an object plane over the specimen stage and to receive light emitted or reflected from the object plane, the scan-head being movable along a first axis normal to the specimen stage and along a second axis relative to the specimen stage and relative to the source while the central axis of the objective lens remains coaxial with the beam axis of the collimated excitation beam.

8. The imaging system of claim 7 wherein the specimen stage is movable along a third axis that is parallel with the object plane to cause the scan-head to scan over the object plane in a pattern as the scan-head and the specimen stage are moved.

9. The imaging system of claim 8 further comprising:

a first linear motor in the scan-head to move the scan-head along the second axis; and a second linear motor in the specimen stage to move the specimen stage along the third axis.

10. The imaging system of claim 9 wherein:

the source of the collimated excitation beam comprises:
    a krypton-argon ion laser to generate an excitation beam centered on the beam axis;
    a beam expander on the beam axis to expand and collimate the excitation beam; and
    a polychroic beamsplitter having a plurality of passbands and a plurality of reflective bands to direct the collimated excitation beam toward the scan-head;

the second axis is parallel with the object plane; and the imaging system further comprises:
    a piezoelectric focus motor in the scan-head to move the objective lens along the first axis;
    a specimen mounted on the specimen stage;
    a flat mirror in the scan-head to reflect the collimated excitation beam from the source to the objective lens;
    an image pinhole;
    a tube lens positioned to receive the emitted or reflected light transmitted through the objective lens and the polychroic beamsplitter and to focus the emitted or reflected light on the image pinhole;
    a PMT coupled to the image pinhole to detect the emitted or reflected light passing through the image pinhole;
    a control system to collect image data from light detected by the PMT and to control the piezoelectric focus motor, the first linear motor, and the second linear motor; and
    a mass storage device to store the image data.

11. An imaging system comprising:

a specimen stage;

a source of a collimated excitation beam centered on a beam axis;

a scan-head comprising an objective lens having a central axis coaxial with the beam axis of the collimated excitation beam, the scan-head being movably positioned to focus the collimated excitation beam on a focal point in an object plane over the specimen stage and to receive light emitted or reflected from the object plane, the scan-head being movable along a first axis and along a second axis relative to the specimen stage and relative to the source while the central axis of the objective lens remains coaxial with the beam axis of the collimated excitation beam; and wherein the source of the collimated excitation beam comprises:
    a light source to generate an excitation beam centered on the beam axis;
    a beam expander on the beam axis to expand and collimate the excitation beam; and
    a beamsplitter to direct the collimated excitation beam toward the scan-head.

12. The imaging system of claim 11, further comprising:

an iris on the beam axis to block edges of the expanded and collimated excitation beam and to transmit a central portion of the collimated excitation beam;

a neutral density filter on the beam axis to modulate an intensity of the collimated excitation beam; and a bandpass filter on the beam axis to transmit a single color in the collimated excitation beam and to block other colors in the collimated excitation beam.

13. The imaging system of claim 11, further comprising:

an image pinhole;

a tube lens positioned to receive the emitted or reflected light transmitted through the objective lens and the beamsplitter and to focus the emitted or reflected light on the image pinhole;

a photodetector coupled to the image pinhole to detect the emitted or reflected light passing through the image pinhole.

14. The imaging system of claim 8 wherein:

the second axis is orthogonal to the first axis; and the third axis is orthogonal to the first axis and the second axis.

15. The imaging system of claim 13 wherein:

the light source comprises a krypton-argon ion laser;

the beamsplitter comprises a polychroic beamsplitter having a plurality of passbands and a plurality of reflective bands; and the photodetector comprises a PMT.

16. The imaging system of claim 15 wherein:

the first axis is normal to the specimen stage; and the imaging system further comprises:
    a piezoelectric focus motor in the scan-head to move the objective lens along the first axis;
    a first linear motor in the scan-head to move the scan-head along the second axis parallel with the object plane;
    a second linear motor in the specimen stage to move the specimen stage along a third axis parallel with the object plane, the second axis being orthogonal to the first axis and the third axis being orthogonal to the first axis and the second axis;
    a specimen mounted on the specimen stage;
    a flat mirror in the scan-head to reflect the collimated excitation beam from the source to the objective lens;

a control system to collect image data from light detected by the PMT and to control the piezoelectric focus motor, the first linear motor, and the second linear motor; and a mass storage device to store the image data.

17. An imaging system comprising:

a specimen stage;

a source of a collimated excitation beam centered on a beam axis; and a scan-head movably positioned to focus the collimated excitation beam on a focal point in an object plane above the specimen stage and to receive light emitted or reflected from the object plane, the scan-head comprising an objective lens having a central axis coaxial with the beam axis of the collimated excitation beam, the scan-head being movable along a first axis and along a second axis relative to the specimen stage and relative to the source while the central axis of the objective lens remains coaxial with the beam axis of the collimated excitation beam.

18. The imaging system of claim 17 wherein the first axis is normal to the specimen stage and the second axis is parallel with the object plane.

19. The imaging system of claim 18 wherein the specimen stage is movable along a third axis that is parallel with the object plane to cause the scan-head to scan over the object plane in a pattern as the scan-head and the specimen stage are moved.

20. The imaging system of claim 19 further comprising:

a first linear motor in the scan-head to move the scan-head along the second axis; and a second linear motor in the specimen stage to move the specimen stage along the third axis.

21. The imaging system of claim 17 further comprising a flat mirror in the scan-head to reflect the collimated excitation beam from the source to the objective lens and to maintain the central axis of the objective lens coaxial with the beam axis of the collimated excitation beam as the scan-head is moved along the first axis and along the second axis.

22. The imaging system of claim 17 wherein the source of the collimated excitation beam comprises:

a light source to generate an excitation beam centered on the beam axis;

a beam expander on the beam axis to expand and collimate the excitation beam; and a beamsplitter to direct the collimated excitation beam toward the scan-head.

23. The imaging system of claim 22 further comprising:

an iris on the beam axis to block edges of the expanded and collimated excitation beam and to transmit a central portion of the collimated excitation beam;

a neutral density filter on the beam axis to modulate an intensity of the collimated excitation beam; and a bandpass filter on the beam axis to pass a single color of the collimated excitation beam and to block other colors in the collimated excitation beam.

24. The imaging system of claim 23 wherein:

the light source comprises a krypton-argon ion laser; and the beamsplitter comprises a polychroic beamsplitter having a plurality of passbands and a plurality of reflective bands.

25. The imaging system of claim 23 further comprising:

an image pinhole;

a tube lens positioned to receive the emitted or reflected light transmitted through the objective lens and the beamsplitter and to focus the emitted or reflected light on the image pinhole; and a PMT coupled to the image pinhole to detect the light passing through the image pinhole.

26. The imaging system of claim 19 wherein:

the second axis is orthogonal to the first axis; and the third axis is orthogonal to the first axis and the second axis.

27. The imaging system of claim 17 further comprising a specimen mounted to the specimen stage.

28. The imaging system of claim 19 further comprising:

a piezoelectric focus motor in the scan-head to move the objective lens along the first axis;

a control system to collect image data from the received light and to control the movement of the scan-head, the objective lens, and the specimen stage; and a mass storage device to store the image data.

29. An imaging system comprising:

a specimen stage;

a light source to generate an excitation beam centered on a beam axis;

a beam expander on the beam axis to expand and collimate the excitation beam;

a beamsplitter to direct the collimated excitation beam;

a scan-head comprising an objective lens having a central axis coaxial with the beam axis of the collimated excitation beam directed by the beamsplitter, the scan-head being movably positioned to focus the collimated excitation beam on a focal point in an object plane over the specimen stage and to receive light emitted or reflected from the object plane, the scan-head being movable along a first axis and along a second axis relative to the specimen stage and relative to the beamsplitter while the central axis of the objective lens remains coaxial with the beam axis of the collimated excitation beam;

an image pinhole;

a lens positioned to receive the emitted or reflected light transmitted through the objective lens and the beamsplitter and to focus the emitted or reflected light on the image pinhole; and a photodetector coupled to the image pinhole to detect the emitted or reflected light passing through the image pinhole.

30. The imaging system of claim 29 further comprising:

an iris on the beam axis to block edges of the expanded and collimated excitation beam and to transmit a central portion of the collimated excitation beam;

a neutral density filter on the beam axis to modulate an intensity of the collimated excitation beam; and a bandpass filter on the beam axis to pass a single color of the collimated excitation beam and to block other colors in the collimated excitation beam.

31. The imaging system of claim 29 further comprising:

a beam scrambler on the beam axis to scramble the collimated excitation beam into a less-coherent, less-speckle inducing excitation beam; and an ocular head between the image pinhole and the beamsplitter to view the emitted or reflected light when the collimated excitation beam has been scrambled.

32. The imaging system of claim 29 wherein:

the beamsplitter comprises a polychroic beamsplitter having a plurality of passbands and a plurality of reflective bands;

the lens comprises a tube lens;

the photodetector comprises a PMT; and the light source comprises a krypton-argon ion laser.

33. The imaging system of claim 29 wherein the first axis is normal to the specimen stage and the second axis is parallel with the object plane.

34. The imaging system of claim 33 wherein the specimen stage is movable along a third axis that is parallel with the object plane to cause the scan-head to scan over the object plane in a pattern as the scan-head and the specimen stage are moved.

35. The imaging system of claim 34 further comprising:

a first linear motor in the scan-head to move the scan-head along the second axis; and a second linear motor in the specimen stage to move the specimen stage along the third axis.

36. The imaging system of claim 29 further comprising a flat mirror in the scan-head to reflect the collimated excitation beam from the beamsplitter to the objective lens and to maintain the central axis of the objective lens coaxial with the beam axis of the collimated excitation beam as the scan-head is moved along the first axis and along the second axis.

37. The imaging system of claim 34 wherein:

the second axis is orthogonal to the first axis; and the third axis is orthogonal to the first axis and the second axis.

38. The imaging system of claim 29 further comprising a specimen mounted to the specimen stage.

39. The imaging system of claim 29, further comprising a piezoelectric focus motor in the scan-head to move the objective lens along the first axis.

40. A method comprising:

aligning elements generating and attenuating a collimated excitation beam with an excitation path optical alignment fixture;

aligning a beamsplitter with a beamsplitter beam target;

generating the collimated excitation beam centered on a beam axis and defining infinity space;

maintaining the beam axis of the collimated excitation beam coaxial with a central axis of an objective lens in a scan-head in the infinity space;

focusing the collimated excitation beam on a focal point in an object plane in a specimen on a specimen stage with the objective lens;

viewing the specimen in an integrated automatic wide view using a laser illuminated scrambler/spreader;

detecting light emanating from the specimen at the focal point with a photodetector to generate a signal based on the light to indicate image data;

selecting a programmable region of interest in the specimen;

selecting a programmable velocity and acceleration and data sampling rate for an arbitrary scan path through the specimen;

moving the objective lens along a z-axis normal to the specimen stage to move the focal point of the objective lens to a different object plane in the specimen;

moving the objective lens along a y-axis orthogonal to the z-axis and parallel with the different object plane in the specimen to scan the specimen in an arbitrary scan path inside the region of interest along the y-axis in a stretching infinity space;

moving the specimen stage along an x-axis orthogonal to the y and z-axes to scan the specimen along the x-axis in the arbitrary scan path inside the region of interest;

collecting the image data to generate an image of the specimen with an automated and unattended control system; and storing the image data in a mass storage device.

41. The method of claim 40 wherein:

generating the collimated excitation beam further comprises:

generating an excitation beam from a krypton-argon ion laser;

expanding and collimating the excitation beam in a beam expander;

blocking edges of the collimated excitation beam with an iris and transmitting a central portion of the collimated excitation beam through the iris;

modulating the intensity of the collimated excitation beam with a neutral density filter;

transmitting a selected color and blocking all other colors in the collimated excitation beam with a bandpass filter; and reflecting the collimated excitation beam toward the objective lens with a flat mirror in the scan-head;

aligning a beamsplitter further comprises aligning a polychroic beamsplitter having a plurality of passbands and a plurality of reflective bands with the beamsplitter beam target to direct the collimated excitation beam toward the objective lens with the polychroic beamsplitter;

detecting light further comprises:

transmitting light reflected or emitted from the specimen through the objective lens and the polychroic beamsplitter;

focusing the light reflected or emitted from the specimen on to a conjugate image plane with a tube lens;

filtering the light reflected or emitted from the specimen through a pinhole in the conjugate image plane; and detecting the light passing through the pinhole with a PMT to generate the image data; and moving the objective lens along a z-axis further comprises moving the objective lens with a piezoelectric focus motor along the z-axis;

moving the objective lens along a y-axis further comprises moving the objective lens with a first linear motor along the y-axis;

moving the specimen stage along an x-axis further comprises moving the specimen stage with a second linear motor along the x-axis; and collecting the image data further comprises collecting the image data and controlling the piezoelectric focus motor, the first linear motor, and the second linear motor with the control system.

42. A method comprising:

generating a collimated excitation beam centered on a beam axis and defining infinity space;

maintaining the beam axis of the collimated excitation beam coaxial with a central axis of an objective lens in a scan-head in the infinity space;

focusing the collimated excitation beam on a focal point in an object plane in a specimen on a specimen stage with the objective lens;

detecting light emanating from the specimen at the focal point with a PMT to generate a signal based on the light to indicate image data;

collecting the image data to generate an image of the specimen with an automated and unattended control system comprising:

integrating the signal from the PMT indicating the instantaneous light passing through the pinhole to generate time-averaged rolling window values in a sampling period;

triggering a sampling of the integrated signal on a movement in the position of the scan-head or the specimen stage or the objective lens detected with a position encoder; and generating an image of the specimen in the focal plane with the samples of the signal; and storing the image data in a mass storage device.

43. The method of claim 42 wherein:

generating a collimated excitation beam further comprises:

generating an excitation beam centered on the beam axis from a krypton-argon ion laser;

expanding and collimating the excitation beam in a beam expander;

directing the collimated excitation beam toward the objective lens with a polychroic beamsplitter having a plurality of passbands and a plurality of reflective bands;

blocking edges of the collimated excitation beam with an iris and transmitting a central portion of the collimated excitation beam through the iris;

modulating the intensity of the collimated excitation beam with a neutral density filter;

reflecting the collimated excitation beam toward the objective lens with a flat mirror in the scan-head; and transmitting a selected color and blocking all other colors in the collimated excitation beam with a bandpass filter;

detecting light further comprises:

transmitting light reflected or emitted from the specimen through the objective lens and the polychroic beamsplitter;

focusing the light reflected or emitted from the specimen on to a conjugate image plane with a tube lens;

filtering the light reflected or emitted from the specimen through the pinhole in the conjugate image plane; and detecting the light passing through the pinhole with the PMT to generate the image data; and the method further comprises:

moving the objective lens with a piezoelectric focus motor along a first axis normal to the specimen stage to move the focal point of the objective lens to a different object plane in the specimen;

moving the objective lens with a first linear motor along a second axis that is orthogonal to the first axis and parallel with the different object plane in the specimen to cause the focal point to traverse the specimen in the different object plane;

moving the specimen stage with a second linear motor along a third axis that is orthogonal to both the first axis and the second axis and parallel with the different object plane to cause the focal point to traverse the specimen in a pattern; and controlling the piezoelectric focus motor, the first linear motor, and the second linear motor with the control system.

44. A method comprising:

generating a collimated excitation beam centered on a beam axis;

focusing the collimated excitation beam with an objective lens on a focal point in an object plane in a specimen on a specimen stage;

maintaining the beam axis of the collimated excitation beam coaxial with a central axis of the objective lens;

moving the objective lens along a first axis relative to the specimen;

moving the objective lens along a second axis relative to the specimen; and detecting light reflected or emitted from the specimen at the focal point to generate image data.

45. The method of claim 44 wherein moving the objective lens along a first axis comprises moving the objective lens along a first axis normal to the specimen stage to move the focal point of the objective lens to a different object plane in the specimen.

46. The method of claim 44 wherein moving the objective lens along a second axis comprises moving the objective lens along a second axis parallel with the object plane in the specimen to cause the focal point to traverse the specimen in the object plane.

47. The method of claim 46, further comprising:

moving the specimen stage along a third axis parallel with the object plane to cause the focal point to traverse the specimen in a pattern;

detecting light reflected or emitted from the specimen at the focal point to generate image data for the pattern; and generating an image of the object plane in the specimen traversed by the focal point.

48. The method of claim 44 wherein focusing the collimated excitation beam further comprises reflecting the collimated excitation beam toward the objective lens with a flat mirror in a scan-head including the objective lens.

49. The method of claim 44 wherein generating a collimated excitation beam comprises:

generating an excitation beam centered on a beam axis from a laser;

expanding and collimating the excitation beam in a beam expander; and directing the collimated excitation beam toward the objective lens with a polychroic beamsplitter having a plurality of passbands and a plurality of reflective bands.

50. The method of claim 47 wherein detecting light comprises:

transmitting light reflected or emitted from the specimen through the objective lens and a polychroic beamsplitter having a plurality of passbands;

focusing the reflected or emitted light on to a conjugate image plane with a tube lens;

filtering the reflected or emitted light through a pinhole in the conjugate image plane; and detecting the light passing through the pinhole with a PMT.

51. The method of claim 47 wherein:

moving the objective lens along a second axis further comprises moving the objective lens along the second axis that is orthogonal to the first axis; and moving the specimen stage further comprises moving the specimen stage along the third axis that is orthogonal to both the first axis and the second axis.

52. A method comprising:

generating a collimated excitation beam centered on a beam axis;

focusing the collimated excitation beam on a focal point in an object plane in a specimen on a specimen stage with an objective lens;

detecting light reflected or emitted from the specimen at the focal point to generate image data;

maintaining the beam axis of the collimated excitation beam coaxial with a central axis of the objective lens;

moving the objective lens along a first axis normal to the specimen stage to move the focal point of the objective lens to a different object plane in the specimen; and moving the objective lens along a second axis parallel with the different object plane in the specimen.

53. The method of claim 54, further comprising:

moving the specimen stage along a third axis parallel with the different object plane to cause the focal point to traverse the specimen in a pattern;

detecting light reflected or emitted from the specimen at the focal point to generate image data for the pattern; and generating an image of the different object plane in the specimen traversed by the focal point according to the pattern.

54. The method of claim 53 wherein detecting light comprises:

transmitting light reflected or emitted from the specimen through the objective lens and a beamsplitter;

focusing the reflected or emitted light on to a conjugate image plane with a tube lens;

filtering the reflected or emitted light through a pinhole in the conjugate image plane; and detecting the light passing through the pinhole with a PMT to generate the image data.

55. The method of claim 53 wherein:

moving the objective lens along a second axis further comprises moving the objective lens along the second axis that is orthogonal to the first axis; and moving the specimen stage further comprises moving the specimen stage along the third axis that is orthogonal to both the first axis and the second axis.

56. The method of claim 54 wherein:

generating a collimated excitation beam further comprises:

generating an excitation beam centered on the beam axis from a krypton-argon ion laser;

expanding and collimating the excitation beam in a beam expander;

directing the collimated excitation beam toward the objective lens with a polychroic beamsplitter having a plurality of passbands and a plurality of reflective bands;

blocking edges of the collimated excitation beam with an iris and transmitting a central portion of the collimated excitation beam through the iris;

modulating the intensity of the collimated excitation beam with a neutral density filter;

transmitting a selected color and blocking all other colors in the collimated excitation beam with a bandpass filter; and reflecting the collimated excitation beam toward the objective lens with a flat mirror in a scan-head including the objective lens; and the method further comprises:

moving the objective lens with a piezoelectric focus motor along the first axis;

moving the objective lens with a first linear motor along the second axis;

moving the specimen stage with a second linear motor along the third axis;

collecting the image data and controlling the piezoelectric focus motor, the first linear motor, and the second linear motor with a control system; and storing the image data in a mass storage device.

57. A method comprising:

generating a collimated excitation beam centered on a beam axis;

reflecting the collimated excitation beam toward an objective lens with a flat mirror in a scan-head including the objective lens;

focusing the collimated excitation beam on a focal point in an object plane in a specimen on a specimen stage with the objective lens; and detecting light reflected or emitted from the specimen at the focal point to generate image data.

58. The method of claim 55 wherein:

generating a collimated excitation beam further comprises:

generating an excitation beam centered on the beam axis from a krypton-argon ion laser;

expanding and collimating the excitation beam in a beam expander;

directing the collimated excitation beam toward the objective lens with a polychroic beamsplitter having a plurality of passbands and a plurality of reflective bands;

blocking edges of the collimated excitation beam with an iris and transmitting a central portion of the collimated excitation beam through the iris;

modulating the intensity of the collimated excitation beam with a neutral density filter; and transmitting a selected color and blocking all other colors in the collimated excitation beam with a bandpass filter;

detecting light further comprises:

transmitting light reflected or emitted from the specimen through the objective lens and the polychroic beamsplitter;

focusing the light reflected or emitted from the specimen on to a conjugate image plane with a tube lens;

filtering the light reflected or emitted from the specimen through a pinhole in the conjugate image plane; and detecting the light passing through the pinhole with a PMT to generate the image data; and the method further comprises:

maintaining the beam axis of the collimated excitation beam coaxial with a central axis of the objective lens;

moving the objective lens with a piezoelectric focus motor along a first axis normal to the specimen stage to move the focal point of the objective lens to a different object plane in the specimen;

moving the objective lens with a first linear motor along a second axis that is orthogonal to the first axis and parallel with the different object plane in the specimen to cause the focal point to traverse the specimen in the different object plane;

moving the specimen stage with a second linear motor along a third axis that is orthogonal to both the first axis and the second axis and parallel with the different object plane to cause the focal point to traverse the specimen in a pattern;

collecting the image data and controlling the piezoelectric focus motor, the first linear motor, and the second linear motor with a control system;

storing the image data in a mass storage device; and generating an image of the different object plane in the specimen from the image data.

59. A method comprising:

generating an excitation beam centered on a beam axis from a krypton-argon ion laser;

expanding and collimating the excitation beam in a beam expander;

directing the collimated excitation beam toward an objective lens with a polychroic beamsplitter having a plurality of passbands and a plurality of reflective bands;

reflecting the collimated excitation beam toward the objective lens with a flat mirror in a scan-head including the objective lens;

focusing the collimated excitation beam on a focal point in an object plane in a specimen on a specimen stage with the objective lens;

maintaining the beam axis of the collimated excitation beam coaxial with a central axis of the objective lens;

moving the objective lens along a first axis normal to the specimen stage to move the focal point of the objective lens to a different object plane in the specimen;

moving the objective lens along a second axis that is orthogonal to the first axis and parallel with the different object plane in the specimen to cause the focal point to traverse the specimen in the different object plane;

moving the specimen stage along a third axis that is orthogonal to both the first axis and the second axis and parallel with the different object plane to cause the focal point to traverse the specimen in a pattern;

detecting light reflected or emitted from the specimen at the focal point to generate image data for the pattern; and generating an image of the different object plane in the specimen traversed by the focal point from the detected light.

60. The method of claim 59, further comprising:

blocking edges of the collimated excitation beam with an iris and transmitting a central portion of the collimated excitation beam through the iris;

modulating the intensity of the collimated excitation beam with a neutral density filter; and transmitting a selected color and blocking all other colors in the collimated excitation beam with a bandpass filter.

61. The method of claim 59 wherein detecting light comprises:

transmitting light reflected or emitted from the specimen through the objective lens and the polychroic beamsplitter;

focusing the light reflected or emitted from the specimen on to a conjugate image plane with a tube lens;

filtering the light reflected or emitted from the specimen through a pinhole in the conjugate image plane; and detecting the light passing through the pinhole with a PMT to generate the image data.

* * * * *

UNITED STATES PATENT AND TRADEMARK OFFICE
CERTIFICATE OF CORRECTION

PATENT NO. : 6,548,796 B1
DATED : April 15, 2003
INVENTOR(S) : Lawrence S. Silvermintz and Robert Elde It is certified that error appears in the above-identified patent and that said Letters Patent is hereby corrected as shown below:

Column 27,
Line 10, delete "claim 54" and insert -- claim 52 -- therefor.

Column 28,
Line 17, delete "claim 55" and insert -- claim 57 -- therefor.

Signed and Sealed this

Fourth Day of November, 2003

JAMES E. ROGAN
*Director of the United States Patent and Trademark Office*